(12) United States Patent
Kagata

(10) Patent No.: US 8,960,881 B2
(45) Date of Patent: Feb. 24, 2015

(54) IMAGE FORMING APPARATUS AND IMAGE FORMING METHOD

(75) Inventor: Takayoshi Kagata, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 286 days.

(21) Appl. No.: 13/412,140

(22) Filed: Mar. 5, 2012

(65) Prior Publication Data

US 2012/0223998 A1 Sep. 6, 2012

(30) Foreign Application Priority Data

Mar. 4, 2011 (JP) ................................. 2011-047983

(51) Int. Cl.
*C09D 11/00* (2014.01)
*G06K 15/02* (2006.01)
*H04N 1/54* (2006.01)

(52) U.S. Cl.
CPC .............. *H04N 1/54* (2013.01); *G06K 15/1869* (2013.01); *G06K 15/1868* (2013.01)
USPC ....................................................... 347/100

(58) Field of Classification Search
USPC ....................................................... 347/100
See application file for complete search history.

(56) References Cited

U.S. PATENT DOCUMENTS

| 5,742,300 A * | 4/1998 | Klassen .............................. 347/9 |
| 2009/0075036 A1* | 3/2009 | Itano et al. .................. 428/195.1 |
| 2009/0244137 A1 | 10/2009 | Kakutani |
| 2009/0244168 A1* | 10/2009 | Kakutani ......................... 347/21 |
| 2010/0134811 A1 | 6/2010 | Fukasawa et al. |
| 2011/0267395 A1 | 11/2011 | Kakutani |

FOREIGN PATENT DOCUMENTS

| JP | 11-078204 A | 3/1999 |
| JP | 11-296693 A | 10/1999 |
| JP | 2005-071326 A | 3/2005 |
| JP | 2009-233877 A | 10/2009 |
| JP | 2010-130405 A | 6/2010 |

* cited by examiner

*Primary Examiner* — Laura Martin
(74) *Attorney, Agent, or Firm* — Nutter McClennen & Fish LLP; John J. Penny, Jr.; Taylor M. Coon

(57) ABSTRACT

A head unit that ejects ink and a control unit that forms a metallic image by ejecting metallic ink that includes metallic particles from the head unit onto a medium are provided, wherein the control unit changes the amount of the metallic ink that is ejected per unit area of the medium based on information that represents the angle between the line of view of a user and an image when the user views the formed metallic image.

4 Claims, 22 Drawing Sheets

METALLIC IMAGE

DOT THINNING PATTERN (STRIPED FORM)
METALLIC IMAGE
THINNING PORTION

DOT THINNING PATTERN (LATTICE FORM)

DOT THINNING PATTERN (CHECKERED PATTERN)

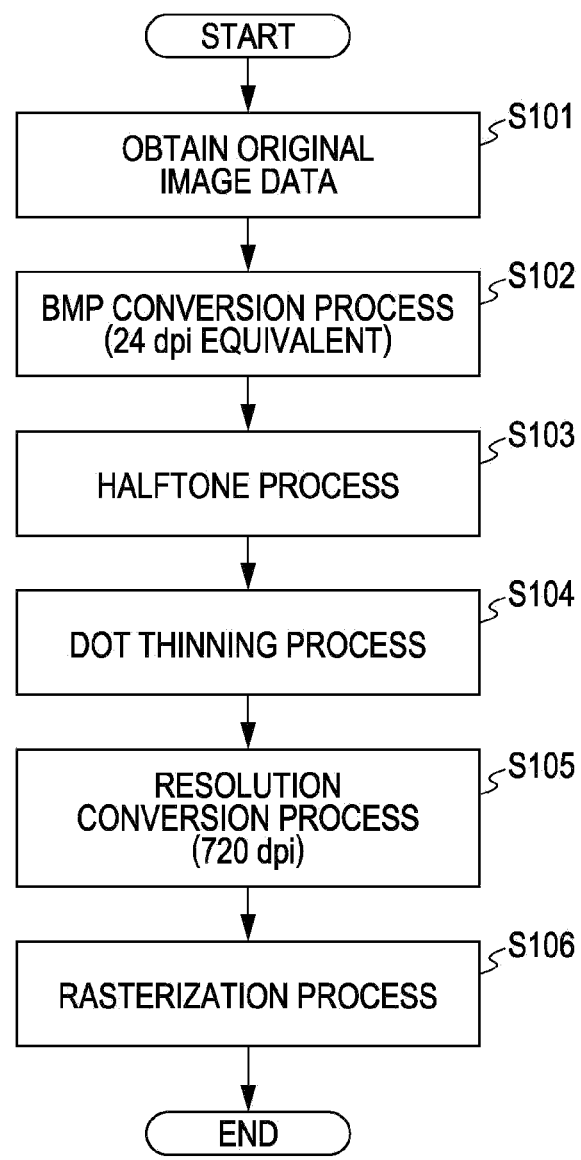

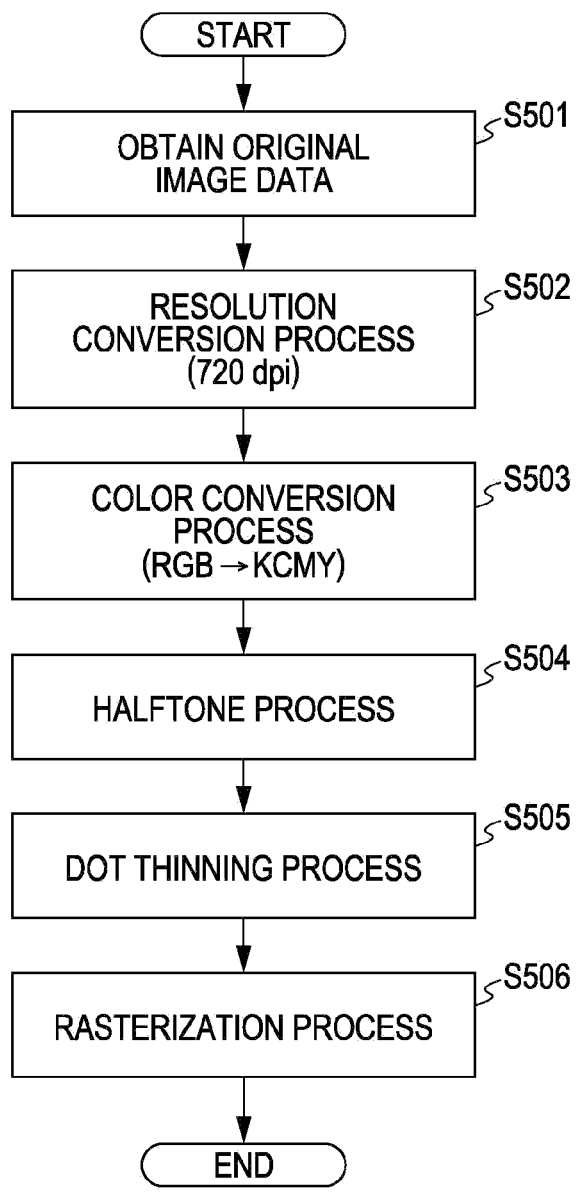

IMAGE FORMING APPARATUS AND IMAGE FORMING METHOD

BACKGROUND

1. Technical Field

The present invention relates to an image forming apparatus and an image forming method.

2. Related Art

An image forming apparatus that performs recording by landing ink droplets (dots) on a medium by ejecting a liquid from nozzles is common. With such an image forming apparatus, printing may be performed using metallic ink that includes metallic particles such as aluminum microparticles as a pigment other than general color ink (for example, each color ink of KCMY).

With metallic printing using metallic ink, since the balance between the metallic luster and the color tone of the printed matter changes according to the amount of metallic particles that are included in the metallic ink, it was difficult to realize metallic printing with a favorable metallic luster at the desired color tone.

On the other hand, in a case when metallic printing is performed using metallic ink that includes aluminum powder as the metallic particles, there is a method of performing printing so that the shape of the metallic image becomes substantially mesh-like. Furthermore, a printing method of performing an adjustment of the metallic luster by controlling the amount of the aluminum powder that is included in the printed matter (image) by changing the size of the mesh has been proposed (for example, JP-A-11-78204).

According to the printing method of JP-A-11-78204, it is possible to print a metallic image with a high image quality and a favorable metallic luster. Such metallic images are sometimes posted at high positions such as on an advertizing banner on the side of a building or an advertisement inside a train. Furthermore, in a case when a user looks diagonally upward from below at a metallic image that is placed in a high place, since the size of the mesh looks different depending on the viewing angle, there appears to be unevenness in the luster and feel of the metallic image.

SUMMARY

An advantage of some aspects of the invention is that an image with a favorable luster and feel according to the viewing angle is formed when printing of a metallic image is performed using metallic ink.

According to an aspect of the invention, there is provided an image forming apparatus including (A) a head unit that ejects ink and (B) a control unit that forms a metallic image by ejecting metallic ink that includes metallic particles from the head unit onto a medium are provided, wherein the control unit changes the amount of the metallic ink that is ejected per unit area of the medium based on information that represents the angle between the line of view of a user and an image when the user views the formed metallic image.

BRIEF DESCRIPTION OF THE DRAWINGS

The invention will be described with reference to the accompanying drawings, wherein like numbers reference like elements.

FIG. 8 is a diagram that represents the flow of image processing of a metallic image according to a first embodiment.

FIG. 17 is a diagram that represents the flow of image processing of a color image according to the second embodiment.

DESCRIPTION OF EXEMPLARY EMBODIMENTS

Figure 1:
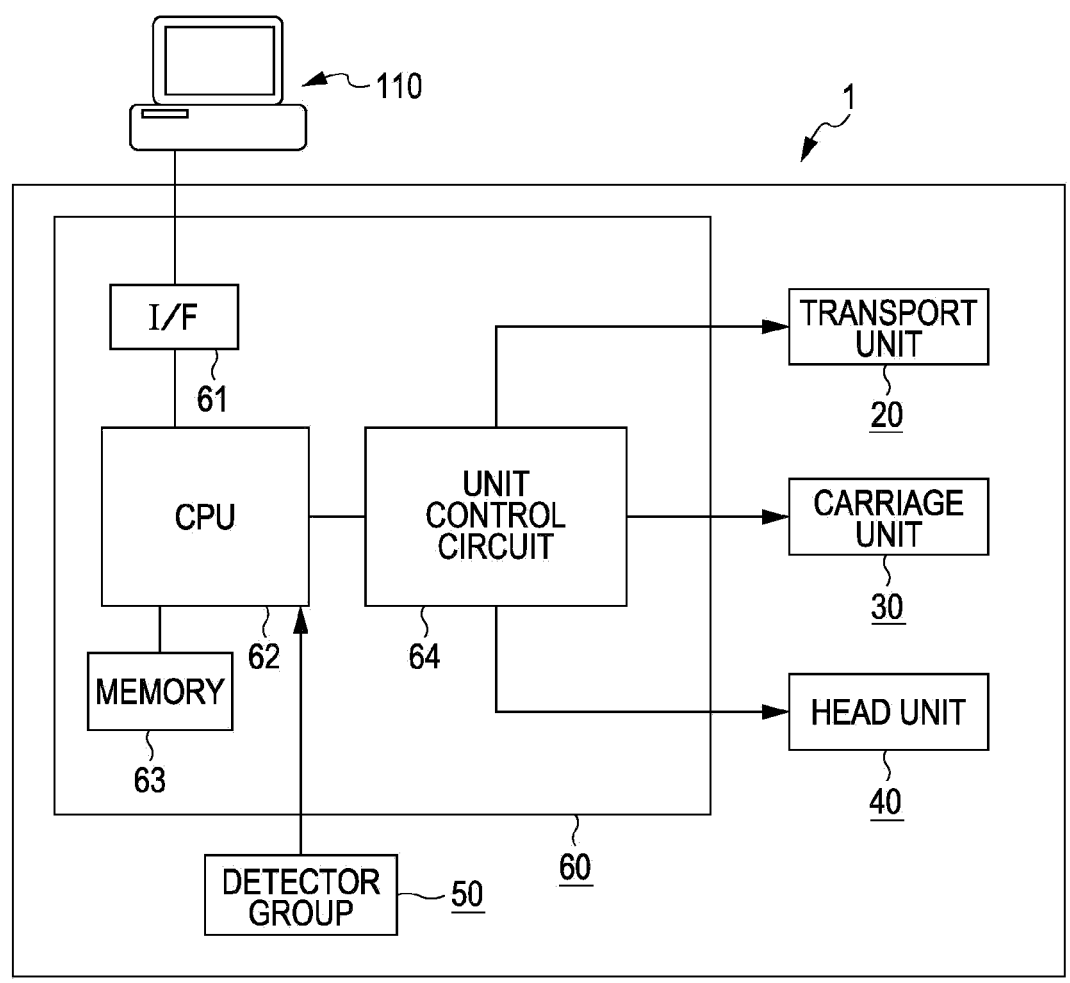
FIG. 1 is a block diagram that illustrates the overall configuration of a printer.

At least the following items become clear from the specification and the attached drawings.

An image forming apparatus that includes (A) a head unit that ejects ink and (B) a control unit that forms a metallic image by ejecting metallic ink that includes metallic particles from the head unit onto a medium are provided, wherein the control unit changes the amount of the metallic ink that is ejected per unit area of the medium based on information that represents the angle between the line of view of a user and an image when the user views the formed metallic image.

According to such an image forming apparatus, it is possible to form an image with favorable luster and feel according to the viewing angle when printing of a metallic image is performed using metallic ink.

According to such an image forming apparatus, it is desirable that the smaller the angle, the less the amount of the metallic ink that is ejected per unit area in a region in which the medium and the line of view intersect.

According to such an image forming apparatus, it is possible to form an image in which the unevenness of the metallic luster that is produced when a metallic image is viewed from a diagonal angle does not stand out.

According to such an image forming apparatus, it is desirable to lessen the amount of the metallic ink that is ejected per unit area of the medium by the control unit thinning out the data of predetermined pixels out of the pixels that configure the metallic image from the metallic image data that represents the metallic image.

According to such an image forming apparatus, it is possible to form an image with favorable luster and feel according to the angle with which the image is viewed by forming various images by changing the thinning pattern when thinning out image data.

According to such an image forming apparatus, in a case when the data of the pixels is thinned out so that the metallic image becomes a striped pattern, it is desirable that the control unit change the amount by which the data of the pixels is thinned out so that the smaller the angle, the narrower the widths of the striped portions of the metallic image or the wider the intervals between the stripes of the metallic image.

According to such an image forming apparatus, it is possible to make unevenness in the luster not stand out simply by adjusting the line widths of the stripes or the intervals of the stripes.

According to such an image forming apparatus, the control unit forms a color image by ejecting color ink from the head unit to the medium according to color image data that represents a color image, and in a case when there is an overlapping portion between the color image and the metallic image, it is desirable that the pixels for which the color ink is ejected out of the color image data and the pixels for which the metallic ink is ejected out of the metallic image data do not overlap.

According to such an image forming apparatus, by forming the metallic image and the color image at the same time, even in a case when metallic color printing is performed, it is possible to improve the overall printing speed.

According to such an image forming apparatus, in a case when the average gradation value of the pixels that configure the color image is greater than a predetermined standard gradation value, it is desirable that the control unit increases the amount of the metallic ink that is ejected to the overlapping portion.

According to such an image forming apparatus, it is possible to form a metallic image with a stable color tone in a region in which the metallic image and the color image are formed overlapping according to the strength of color of the color image.

According to such an image forming apparatus, it is desirable that the control unit eject the metallic ink from the head unit to the medium so that the metallic image has widths of a predetermined size or greater.

According to such an image forming apparatus, it is possible to reliably form a metallic image with metallic luster.

Further, an image forming method of forming a metallic image on a medium by ejecting metallic ink that includes metallic particles and changing the amount of the metallic ink that is ejected per unit area of the medium based on information that represents the angle between the line of view of the user and the image when the user views the metallic image will be made clear.

Basic Configuration of Image Forming Apparatus

An ink jet printer (printer 1) will be described as an example of the image forming apparatus as an embodiment of the invention.

Configuration of Printer 1

Figure 2A:
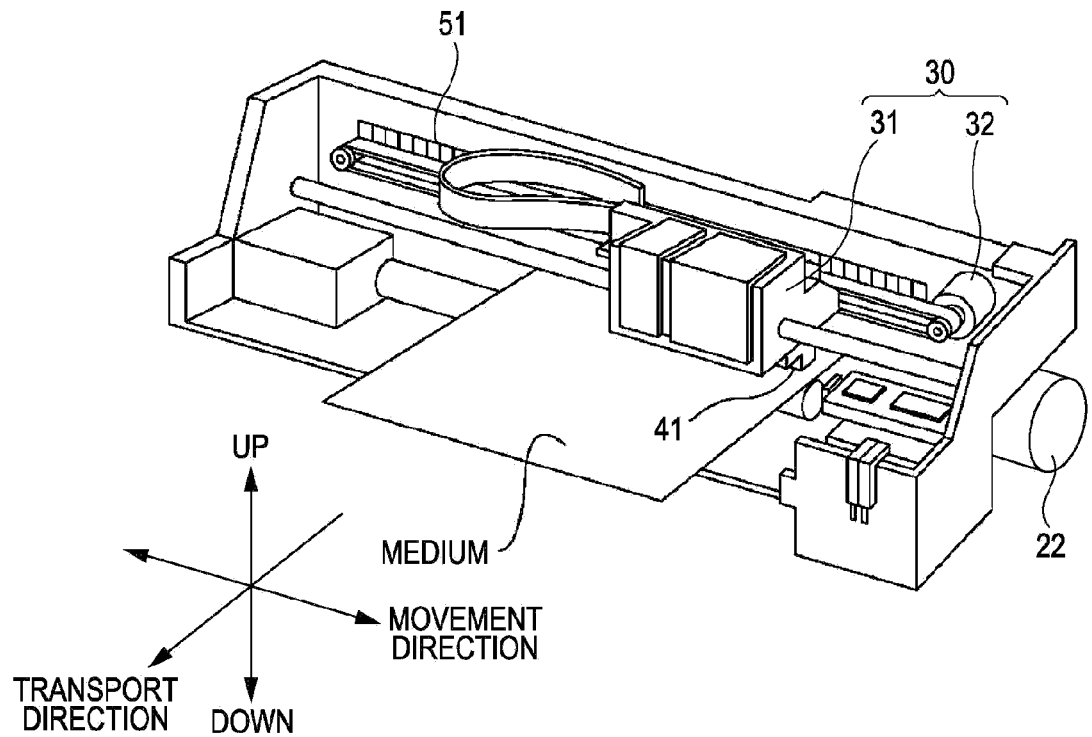
FIG. 2A is a bird's eye view that represents the configuration of the printer.
Figure 2B:
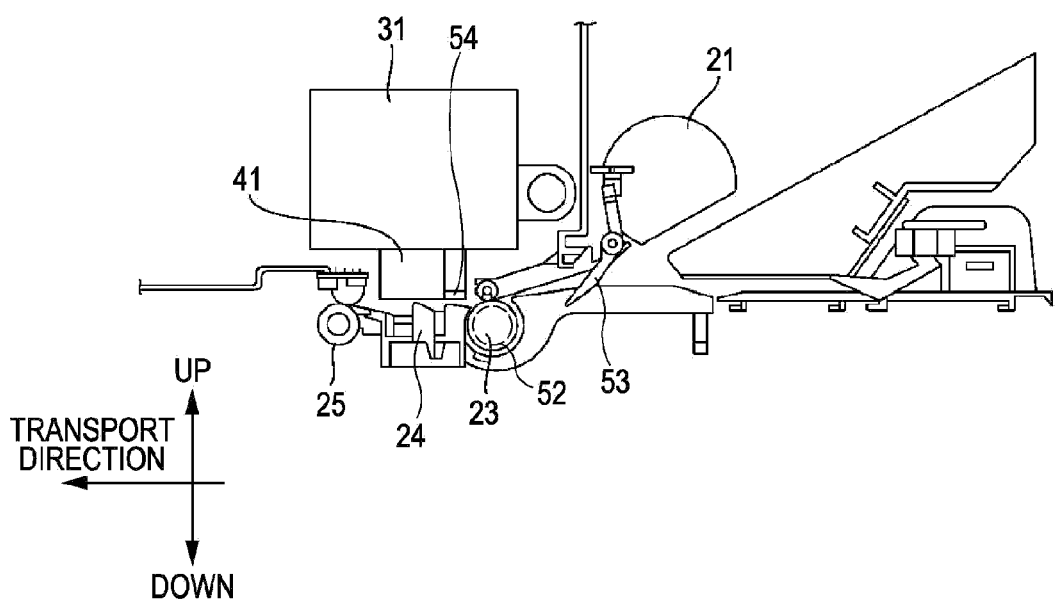
FIG. 2B is a side view diagram that describes the configuration of the printer.

FIG. 1 is a block diagram that illustrates the overall configuration of the printer 1. FIG. 2A is a diagram that describes the configuration of the printer 1 of the embodiment. FIG. 2B is a side view diagram that describes the configuration of the printer 1 of the embodiment.

The printer 1 is an image forming apparatus that forms (prints) characters and images on a medium such as paper, cloth, or film, and is connected to be communicable with a computer 110 that is an external apparatus.

A printer driver is installed on the computer 110. The printer driver is a program for displaying a user interface on the display apparatus and converting image data that is output from an application program into recording data. The printer driver is recorded on a recording medium (computer-readable recording medium) such as a flexible disk FD or a CD-ROM. Further, the printer driver is able to be downloaded onto the computer 110 via the Internet. Here, the program is configured by a code for realizing various functions.

The computer 110 is an image forming apparatus control unit for causing the printer 1 to print an image which outputs print data that corresponds to an image to be printed to the printer 1.

The printer 1 includes a transport unit 20, a carriage unit 30, a head unit 40, a detector group 50, and a controller 60. The controller 60 controls each unit based on print data that is received from the computer 110 that is the image forming apparatus control unit, and causes the image to be formed on a medium. The status within the printer 1 is monitored by the detector group 50, and the detector group 50 outputs the detection result to the controller 60. The controller 60 controls each unit based on the detection result that is output from the detector group 50.

Transport Unit 20

The transport unit 20 is for transporting the medium (for example, paper S and the like) in a predetermined direction (hereinafter referred to as the transport direction). Here, the transport direction is a direction that intersects the carriage movement direction. The transport unit 20 includes a paper feeding roller 21, a transport motor 22, a transport roller 23, a platen 24, and a paper ejection roller 25 (FIGS. 2A and 2B).

The paper feeding roller 21 is a roller for feeding the paper S that is inserted into a paper insertion opening into the printer. The transport roller 23 is a roller for transporting the paper S that is fed from the paper feeding roller 21 to a recordable region, and is driven by the transport motor 22. The actions of the transport motor 22 are controlled by the controller 60 on the printer side. The platen 24 is a member that supports the paper S that is being recorded from the back side. The paper ejection roller 25 is a roller that ejects the paper S to the outside, and is provided to the transport direction downstream side with respect to the recordable region.

Carriage Unit 30

The carriage unit 30 is for moving (also referred to as "scanning") a carriage 31 that is attached to the head unit 40 in a predetermined direction (hereinafter also referred to as the movement direction). The carriage unit 30 includes the carriage 31 and a carriage motor 32 (also referred to as a CR motor) (FIGS. 2A and 2B).

The carriage 31 is able to reciprocate in the movement direction (also referred to as the scan direction), and is driven by the carriage motor 32. The actions of the carriage motor 32 are controlled by the controller 60 on the printer side. Further, the carriage 31 retains a detachable cartridge that contains a liquid (hereinafter, also referred to as ink) that records images.

Head Unit 40

The head unit 40 ejects ink to the paper S. The head unit 40 includes a head 41 that includes a plurality of nozzles. The head 41 is provided on the carriage 31, and when the carriage 31 moves in the movement direction, the head 41 also moves in the movement direction. Furthermore, by ejecting ink intermittently while the head 41 is moving in the movement direction, dot lines (raster lines) are formed on the paper along the movement direction.

Figure 3:
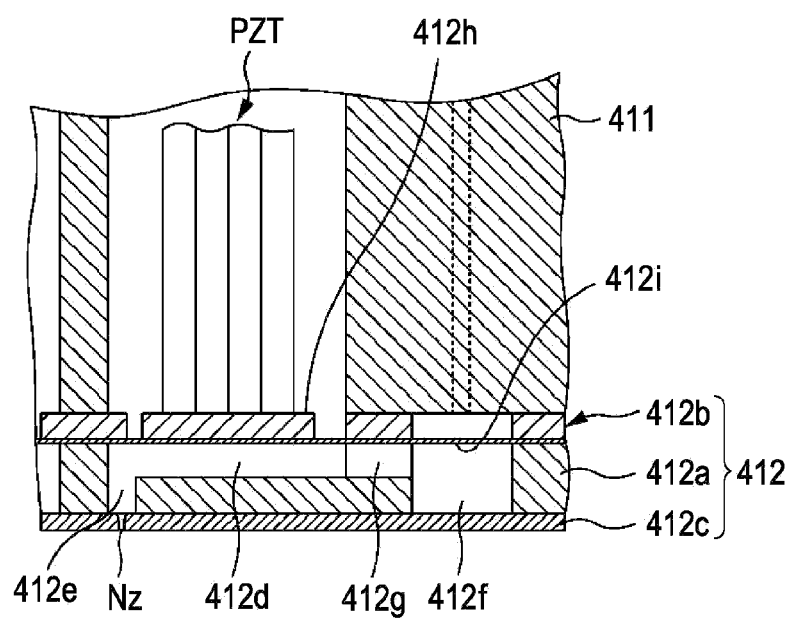
FIG. 3 is a cross-sectional diagram for describing the structure of a head.

FIG. 3 is a cross-sectional diagram that illustrates the structure of the head 41. The head 41 includes a case 411, a flow path unit 412, and a piezo element group PZT. The case 411 contains the piezo element group PZT, and the flow path unit 412 is joined to the lower face of the case 411. The flow path unit 412 includes a flow path formation plate 412a, an elastic plate 412b, and a nozzle plate 412c. A groove portion that is a pressure chamber 412d, a penetration portion that is a nozzle communication port 412e, a penetration portion that is a common ink chamber 412f, and a groove portion that is an ink supply path 412g are formed on the flow path formation plate 412a. The elastic plate 412b includes an island portion 412h to which the distal end of the piezo elements PZT is joined. An elastic region by an elastic film 412i is formed in the surroundings of the island portion 412h. Ink that is pooled in ink cartridges is supplied to the pressure chamber 412d that corresponds to each nozzle Nz via the common ink chamber 412f. The nozzle plate 412c is a plate on which the nozzles Nz are formed.

The piezo element group PZT includes a plurality of comb-shaped piezo elements (driving elements). There are as many piezo elements as there are nozzles Nz. When a driving signal COM is applied to the piezo elements by a wiring substrate (not shown) on which a head control unit HC and the like are mounted, the piezo elements expand and contract in the vertical direction according to the electric potential of the driving signal COM. When the piezo elements expand and contract, the island portion 412h is pushed to the pressure chamber 412d side or pulled in the opposite direction. At this time, ink droplets are ejected from the nozzles by the pressure in the pressure chamber 412d increasing or decreasing by the elastic film 412i in the surroundings of the island portion 412h deforming.

Figure 4:
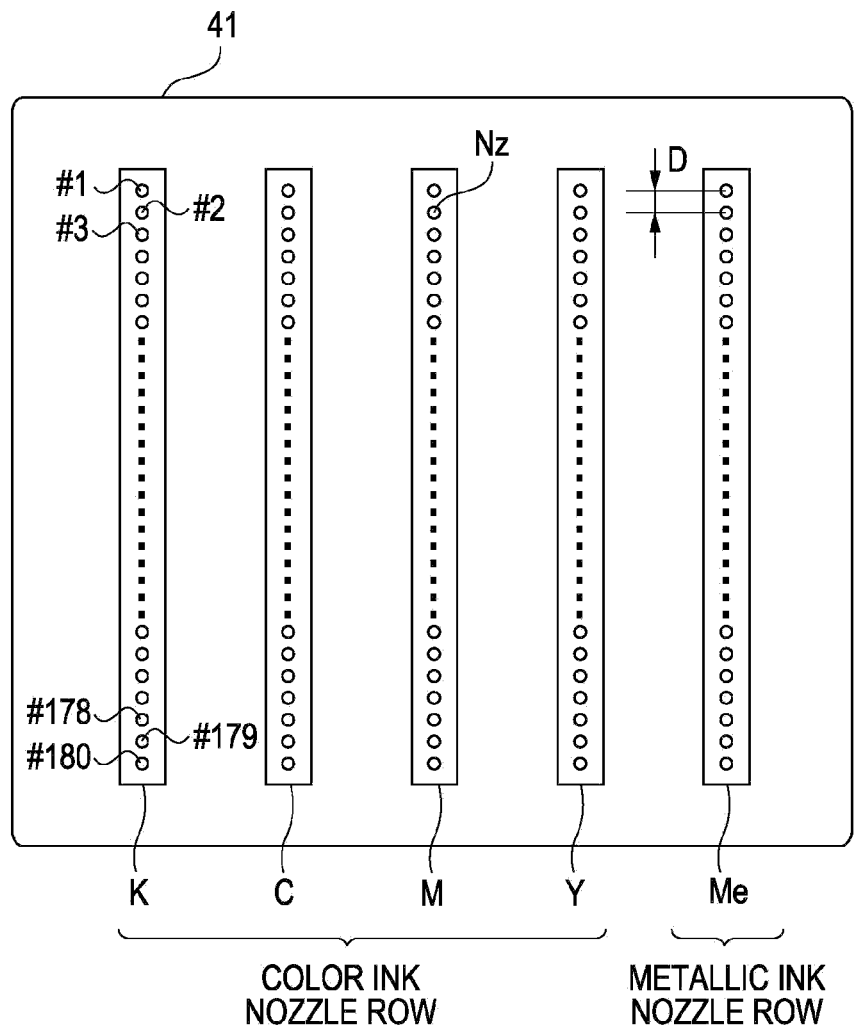
FIG. 4 is an explanatory diagram of nozzles Nz that are provided on the head.

FIG. 4 is an explanatory diagram of the nozzles Nz that are provided on the lower face (nozzle face) of the head 41. A color ink nozzle row composed of a yellow nozzle row Y that ejects yellow ink, a magenta nozzle row M that ejects magenta ink, a cyan nozzle row C that ejects cyan ink, and a black nozzle row K that ejects black ink, and a metallic ink nozzle row Me that ejects metallic ink are formed on the nozzle face. As illustrated in FIG. 4, each of the nozzle rows KCMY and Me are configured by the nozzles Nz that are ejection portions for ejecting the ink of each color being arranged in the transport direction with a predetermined interval D. Each nozzle row respectively includes 180 nozzles Nz from #1 to #180. Here, the actual number of nozzles in each nozzle row is not limited to 180, and for example, the number of nozzles may be 90 or 360. Further, in FIG. 4, although each nozzle row is arranged parallel along the transport direction, a configuration in which each nozzle row is arranged in a column along the transport direction is also possible. Further, rather than including one nozzle row for each color of KCMY-Me, a configuration in which each color respectively includes a plurality of nozzle rows is also possible.

Detector Group 50

The detector group 50 is for observing the status of the printer 1. The detector group 50 includes a linear encoder 51, a rotary encode 52, a paper detection sensor 53, an optical sensor 54, and the like (FIGS. 2A and 2B).

The linear encoder 51 detects the position of the carriage 31 in the movement direction. The rotary encoder 52 detects the rotation amount of the transport roller 23. The paper detection sensor 53 detects the position of the distal end of the paper S that is being fed. The optical sensor 54 detects the presence of the paper S that is positioned opposite by a light emitting unit and a light receiving unit that are attached to the carriage 31, and for example, is able to detect the width of the paper by detecting the position of the end portion of the paper while moving. Further, the optical sensor 54 is also able to detect the distal end (end portion on the transport direction downstream side, also referred to as the upper end) or the back end (end portion on the transport direction upstream side, also referred to as the lower end) of the paper S depending on the situation.

Controller 60

The controller 60 is a control unit for performing control of the printer. The controller 60 includes an interface unit 61, a CPU 62, a memory 63, and a unit control circuit 64 (FIG. 1).

The interface unit 61 performs transceiving of data between the computer 110 that is an external apparatus and the printer 1. The CPU 62 is a calculation process apparatus for performing overall control of the printer 1. The memory 63 is for securing a region in which to accommodate programs of the CPU 62, work regions, and the like, and is configured by a storage element such as a RAM or an EEPROM. Furthermore, the CPU 62 controls each unit of the transport unit 20 via the unit control circuit 64 according to a program that is accommodated in the memory 63.

Printing Actions of Printer

The printing actions of the printer 1 will be briefly described. The controller 60 receives a print command from the computer 110 via the interface unit 61, and performs a paper feeding process, a dot formation process, a transport process, and the like by controlling each unit.

The paper feeding process is a process of supplying the paper to be printed into the printer and positioning the paper at the print start position (also referred to as the ready position). The controller 60 rotates the paper feeding roller 21 and sends the paper to be printed to the transport roller 23. Next, the transport roller 23 is rotated, and the paper that is sent from the paper feeding roller 21 is positioned at the print start position.

The dot formation process is a process of forming dots on paper by intermittently ejecting ink from a head that moves along the transport direction (scan direction). The controller 60 moves the carriage 31 in the movement direction and ejects ink from nozzle rows that are provided on the head 41 based on the print data while the carriage 31 is being moved. When the ejected ink droplets land on the paper, dots are formed on the paper and dot lines composed of a plurality of dots along the movement direction are formed on the paper.

The transport process is a process of moving the paper along the transport direction relative to the head. The controller 60 transports the paper in the transport direction by rotating the transport roller 23. By such a transport process, the head 41 becomes able to form dots at positions that are different from the positions of the dots that are formed by the earlier dot formation process.

The controller 60 repeats the dot formation process and the transport process in an alternating manner until data to be printed runs out, and gradually prints images configured by dot lines on the paper. Furthermore, when the data to be printed runs out, the paper is ejected by rotating the paper ejection roller 25. Here, the determination of whether or not to perform paper ejection may be based on a paper ejection command included in the print data.

The same process is repeated in a case when printing is to be performed on the next sheet of paper, and the printing action is ended in a case when printing is not to be performed.

As the printing actions of the printer 1, there is "unidirectional printing" in which ink droplets are ejected from the nozzles during the outgoing movement of moving from the right side (home position) to the left side in the movement direction (scan direction) and ink droplets are not ejected from the nozzles during the returning movement when the head 41 moves from the left side to the right side and "bidirectional printing" in which ink droplets are ejected from the nozzles during both the outgoing movement and the returning movement. The printing method described in the embodiment is compatible with both printing actions of "unidirectional printing" and "bidirectional printing".

Metallic Ink Used in Printing

The metallic ink includes silver particles, aluminum particles, and the like as metallic particles. It is possible to obtain bright metallic luster on the print face with metallic ink that includes aluminum particles. However, aluminum particles oxidize easily, and there is a concern that the print face becomes whitened over time. On the other hand, with metallic ink that includes silver particles, while there are problems that the color of the metallic ink tends to become dark compared to ink that includes aluminum particles and the cost is high, silver particles do not easily oxidize and have the characteristic of being excellent in stability. Although the metallic ink to be used during printing may be selected according to the needs of the print, printing using metallic ink that includes silver particles will be described in the present specification. Here, according to the printing method of each of the embodiments described below, it is also possible to resolve the problems of the cost, the darkness of the color, and the like of using such silver particles.

As the solvent of the metallic ink, pure water or ultrapure water such as deionized water, ultrafiltered water, reverse osmosis water, and distilled water is used. There may be ions and the like in the water as long as the dispersal of the metallic particles is not impeded. Further, surfactants, polyalcohols, pH adjusting agents, resins, colorants, and the like may be included as necessary.

The silver particles that are included in the ink composition are particles with silver as the principal component. The silver particles may include, for example, other metals, oxygen, carbon, and the like as accessory components. The purity of the silver within the silver particles may be, for example, equal to or greater than 80%. The silver particles may be an alloy of silver and another metal. Further, the silver particles within the ink composition may exist in a colloidal (particle colloidal) state. In a case when the silver particles are dispersed in a colloidal state, the dispersion becomes more favorable, and for example, contributes to an improvement in the stability of the ink composition.

A particle diameter d90 of the particle diameter accumulation curve of the silver particles is 50 nm to 1 μm. Here, the particle diameter accumulation curve is a type of curve that is obtained by statistically processing the result of performing a measurement that is able to ascertain the particle diameter and the number of particles that are present with regard to the silver particles that are dispersed in a liquid such as an ink composition. In the particle diameter accumulation curve in the specification, the horizontal axis is the particle diameter and the vertical axis is the value (integrated value) of the particle mass (product of the volume, the particle density, and the number of particles when the particles are considered to be spheres) which is integrated from particles with small diameters to particles with large diameters. Furthermore, the particle diameter d90 refers to the value of the horizontal axis when the vertical axis is standardized (total mass of measure particles is 1) and the value of the vertical axis becomes 90% (0.90), that is, the particle diameter. Here, the diameters of the silver particles in such a case may be the diameters of the silver particles themselves, or may be the diameters of the particle colloids in a case when the silver particles are dispersed in a colloidal form.

The particle diameter accumulation curve of the silver particles is able to be ascertained, for example, by using a particle diameter distribution measurement apparatus based on a dynamic light scattering method. The dynamic light scattering method irradiates the dispersed silver particles with a laser beam and observes the scattered light with a photon detector. Generally, the dispersed silver particles are usually in Brownian motion. The speed of the motion of the silver particles is greater for particles with large particle diameters, and less for particles with small particle diameters. If a laser beam is irradiated on silver particles in Brownian motion, the swaying that corresponds to the Brownian motion of each silver particle is observed in the scattered light. It is possible to ascertain the diameter of the silver particles and the frequency (number) of the silver particles corresponding to the diameter by measuring the swaying, ascertaining the autocorrelation function by a photon correlation method or the like, and using cumulant method and histogram method analysis and the like. In particular, a dynamic light scattering method is suited to samples that include silver particles of a submicron size, and it is possible to obtain the particle diameter accumulation curve relatively easier by a dynamic light scattering method. Examples of particle diameter distribution measurement apparatuses based on a dynamic light scattering method include, for example, Nanotrack UPA-EX150 (manufactured by Nikkiso Co., Ltd.), ELSZ-2, DLS-8000 (both manufactured by Otsuka Electronics Co., Ltd.), and LB-550 (manufactured by Horiba, Ltd.).

Metallic Image

The metallic image is formed by forming many metallic ink dots by ejecting the metallic ink described above onto a medium from a metallic ink nozzle row that is provided on the head 41. In normal metallic printing, metallic ink dots are formed for all pixels that are indicated by image data. That is, the metallic image is formed by daubing over with metallic ink. However, with the embodiment, printing of a metallic image with a favorable metallic luster is realized by adjusting the amount of metallic particles (amount of metallic ink) that are present on the medium by thinning out the metallic ink dots on some of the pixels.

Thinning Out of Metallic Image

Figure 5A:
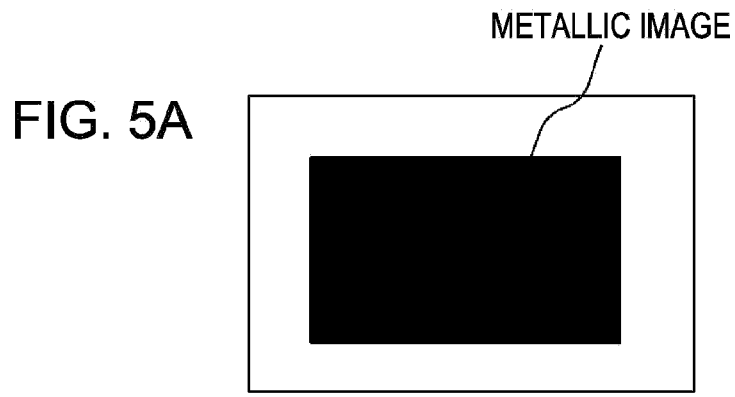
FIG. 5A is a diagram that represents the original image of a metallic image before dot thinning.
Figure 5B:
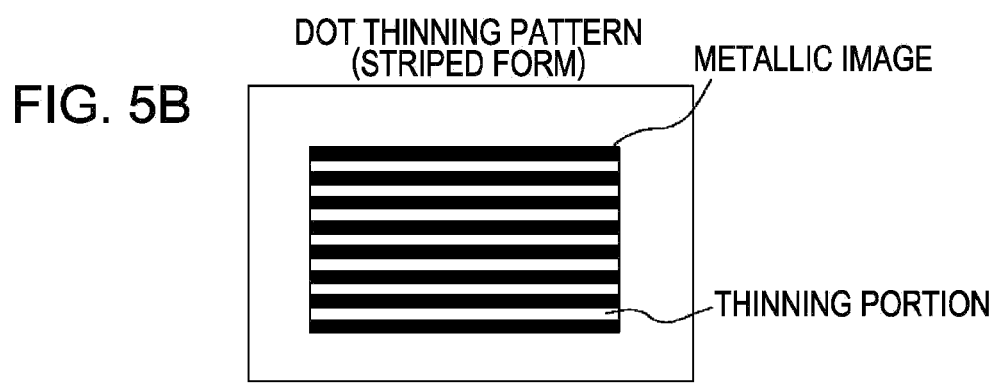
FIG. 5B is a diagram that illustrates an example of an image pattern that is printed in a case when dots are thinned out so that the metallic image becomes a striped pattern.
Figure 5C:
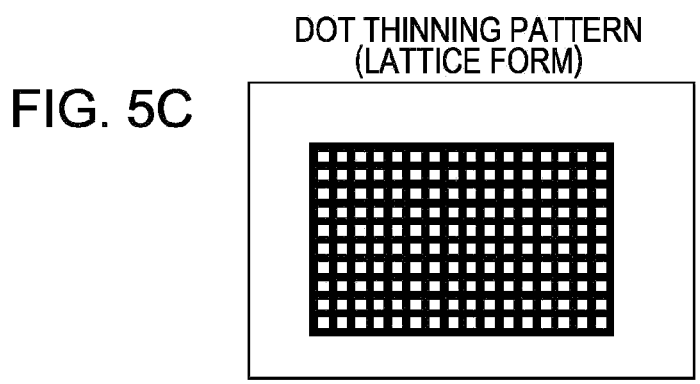
FIG. 5C is a diagram that illustrates an example of an image pattern that is printed in a case when dots are thinned out so that the metallic image becomes a lattice pattern.
Figure 5D:
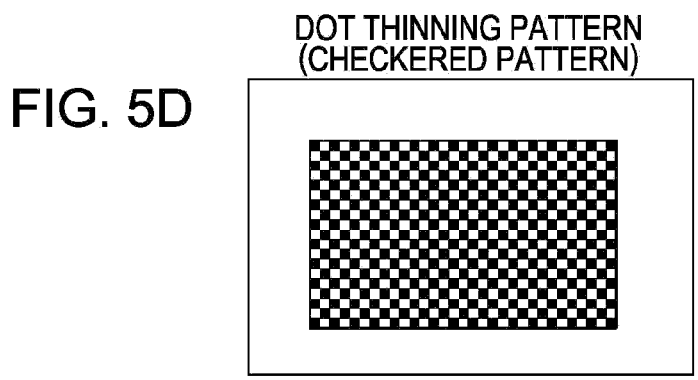
FIG. 5D is a diagram that illustrates an example of an image pattern that is printed in a case when dots are thinned out so that the metallic image becomes a checkered pattern.

Diagrams that describe examples of dot thinning of a metallic image are illustrated in FIG. 5A and FIGS. 5B to 5D. FIG. 5A is a diagram that represents the original image of a metallic image before dot thinning. FIG. 5B is an example of an image pattern that is printed in a case when dots are thinned out so that the metallic image of FIG. 5A becomes a striped pattern. FIG. 5C is an example of an image pattern that is printed in a case when dots are thinned out so that the metallic image of FIG. 5A becomes a lattice pattern. FIG. 5D is an example of an image pattern that is printed in a case when dots are thinned out so that the metallic image of FIG. 5A becomes a checkered pattern. Here, in order for the thinning patterns to be easier to understand in FIGS. 5B to 5D, the dot thinning widths and intervals are made somewhat larger than is actually the case so that the dot thinner patterns are easier to recognize.

The image data of the original image at the print start point is instructed so that dots are to be formed on all pixels of a region that configures the metallic image. That is, as illustrated in FIG. 5A, printing is started based on data in which a rectangular shape is formed by daubing over with the metallic ink. The printer driver prints the metallic image of the state in which dots are thinned out as shown in FIGS. 5B to 5D by generating metallic print data that represents the pixels onto which the metallic ink is to be ejected and pixels onto which the metallic ink is not to be ejected by thinning out the data of predetermined pixels. Here, the thinning patterns of the dots may be patterns other than those in FIGS. 5B to 5D. The method of generating the print data will be described later.

When printing a metallic image, if printing is performed by daubing altogether as in FIG. 5A, there is too much metallic ink on the medium, and the number of metallic particles that are included in the ink becomes excessive. In such a state, the entirety of the formed metallic image appears dark, and it is difficult to obtain an image with a favorable color tone.

On the other hand, by adjusting the amount of the metallic particles that are included in the image by thinning out a portion of the dots from the image to be printed as illustrated in FIGS. 5B to 5D, it becomes possible to form a metallic image with a favorable color tone.

On the other hand, in order to maintain the metallic luster of a metallic image, there must be a certain amount of metallic particles on the medium. That is, there is a need for a minimum amount of metallic ink dots which is needed to express a metallic luster by reflecting light. Therefore, if the thinning amount is too great when thinning out the metallic ink dots from the metallic image, there are not enough metallic ink dots, the metallic luster becomes insufficient, and the image quality of the metallic image deteriorates.

For example, in a case when thinning out the dots so that the metallic image becomes a striped pattern as in FIG. 5B, if the widths of the striped portions of the metallic image after dot thinning becomes thinner than a predetermined width, a sufficient metallic luster is not obtained. Specifically, if the line widths of the striped portions become thinner than 1 mm, a favorable metallic luster is not obtained. Therefore, when thinning out dots from the metallic image, it is necessary to thin out the dots so that regions (range within which metallic ink dots are formed) with at least 1 mm$^2$ are secured.

COMPARATIVE EXAMPLE

Angle at which Metallic Image is Viewed

When the user views a metallic image in a state in which the dots are thinned out as described above, there may be a case when the way the image appears changes depending on the viewing angle. In particular, since the portions of the metallic ink dots have been thinned out in the embodiment, the impression of the image changes greatly depending on the angle at which the image is viewed. Therefore, how the way the image is viewed differs in a case when viewing angles differ for a metallic image in which the metallic ink dots are thinned out evenly over the entirety thereof will be described as a comparative example.

Diagrams for describing how an image appears in a case when an image is observed from different angles are illustrated in FIGS. 6A and 6B and 7A and 7B. In all of FIGS. 6A and 6B and 7A and 7B, the image that is the observation target is a metallic image in which metallic ink dots have been thinned out in a striped pattern with even intervals, and is an image with a striped pattern that is horizontal with respect to the line of view (horizontal striped pattern) so that changes in the intervals of the striped pattern can be easily recognized depending on the viewing angle.

Figure 6A:
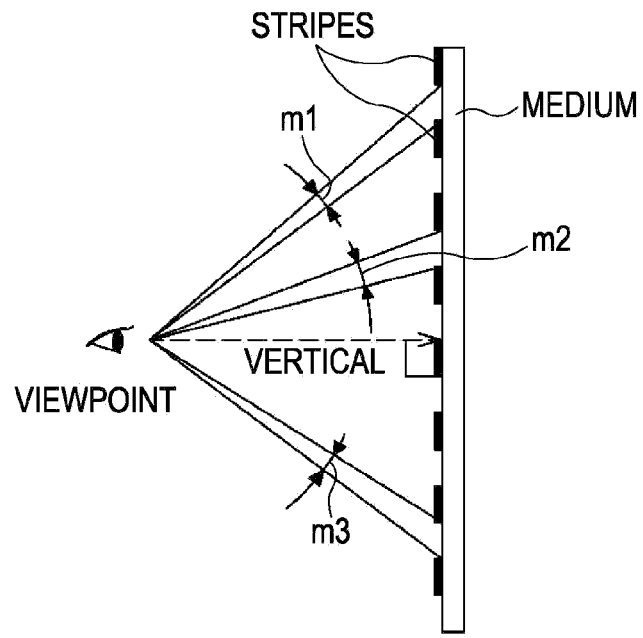
FIG. 6A is a diagram that represents the relationship between an image that is the observation target and the viewpoint when viewing the image (in a case when the angle of the line of view is vertical).
Figure 6B:
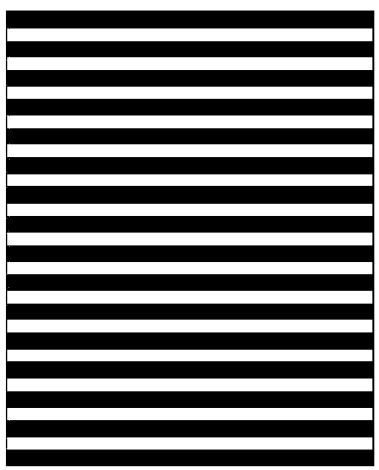
FIG. 6B represents the state of the image that is actually perceived.

FIG. 6A represents the relationship between the observation target image and the viewpoint when viewing the image, and FIG. 6B represents the state of the image that is actually perceived. That is, the state of the image that is recognized when the central region of the image is viewed from the front so that the line of view becomes vertical with respect to the image. Since the image is viewed from a viewpoint that opposes the front of the image, the horizontal striped pattern of the image appears to be vertically symmetrical with respect to the center of the line of view (central portion of the image in the drawing), and the intervals of the horizontal striped pattern (interval between stripes) appear to have equal widths at any position of the image. The reason is that as illustrated in FIG. 6A, there are no great differences in the angles between the line of view and the intervals of the striped pattern. For example, m1 at the top of the image, m2 near the central portion of the image, and m3 at the bottom of the image in the drawing respectively appear equal.

Therefore, when viewing from the front center, the observation target image is recognized as an image with an even striped pattern as illustrated in FIG. 6B. Since the line widths and the intervals of the lines appear even, the luster and the color tone of the metallic image also appear even over the entire image. Further, the outline of the image appears to be a rectangle as in the drawing.

Here, although large dot thinning intervals have been illustrated in the drawing so that the striped pattern is easily recognized, dot thinning intervals are often finer for actual metallic images.

Figure 7A:
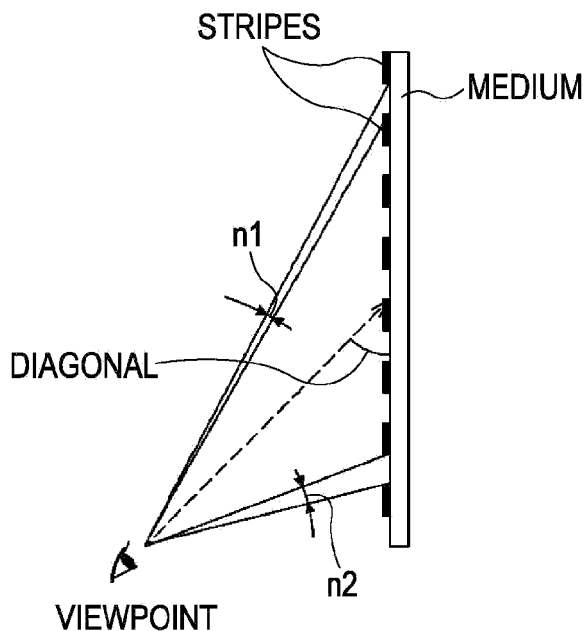
FIG. 7A is a diagram that represents the relationship between an image that is the observation target and the viewpoint when viewing the image (in a case when the angle of the line of view is diagonal).
Figure 7B:
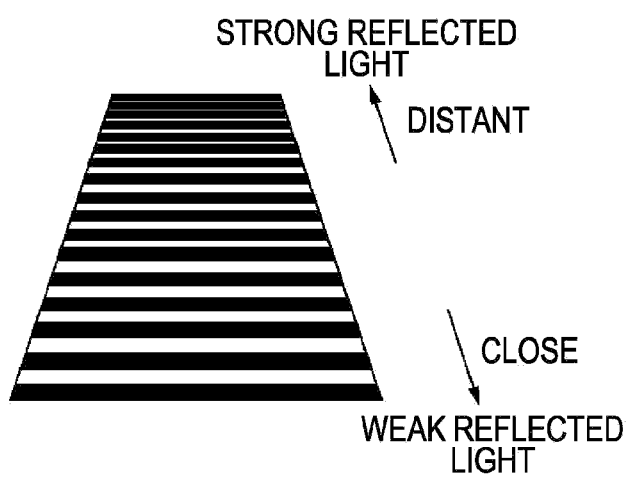
FIG. 7B represents the state of the image that is actually perceived.

Next, FIG. 7A represents the relationship between the observation target image and the viewpoint of viewing the image, and FIG. 7B represents the state of the image that is actually perceived. That is, the state of an image that is recognized in the case of viewing from a viewpoint as if to look upward at the central region of the image from below so that the line of view becomes diagonal with respect to the image is represented. Since the image is viewed from diagonally below, the horizontal striped pattern of the image appears very differently for the upper portion and the lower portion of the image. In a case when viewing the image from diagonally below, the angle between the line of view and the image becomes gradually smaller toward the top of the image. Therefore, as illustrated in FIG. 7A, the angle between the line of view and an interval of the striped pattern also tends to be recognized as narrow at the top of the image (for example, n1 in the drawing) and wide at the bottom of the image (for example, n2 in the drawing). Therefore, the higher in the image (the further from the viewpoint), the narrower the intervals of the striped pattern of the image.

Here, in the embodiment, an image is formed using metallic ink that reflects light. In a case when "light" is perceived by the human eye, light appears to spread radially rather than as a dot (for example, a glare phenomenon that occurs in a case when light from illumination is viewed in the dark). Therefore, light that is reflected by the striped portions also appear to spread. At portions where the intervals between the stripes are narrow (portions that appear narrow) as at the top of the image, the intervals become hard to recognize with the naked eye due to the spread of reflected light, and the reflected light appears to be stronger than at the bottom of the image. The metallic luster and the feel of the image therefore appear to change between the top and bottom.

Such a phenomenon is more pronounced for larger images. The reason is that the larger the observation target image, the greater the differences in the distances from the viewpoint (differences in perspective). Therefore, in a case when viewing a giant advertizing banner that is posted on the side of a building outdoors, the luster and the feel of the metallic image appear deteriorated, posing a problem.

FIRST EMBODIMENT

In the first embodiment, metallic printing is performed so that when a metallic image is formed, the metallic image has the optimum luster and feel according to the viewing angle.

In the comparative example above, there were differences in the metallic luster and the feel of the image by the differences in perspective in a case when an image was viewed from a diagonal angle. Therefore, in the embodiment, by changing the way the metallic ink dots are thinned out according to information of "the angle at which the image is viewed" the metallic luster is made to appear even, even in a case when the image is viewed from a diagonal direction. Here, although the color image by color ink (each color ink of black (K), cyan (C), magenta (M), and yellow (Y)) may be formed at the same time as the metallic printing, in the embodiment, the metallic image and the color image are respectively formed individually without overlapping portions.

Important Points when Forming Metallic Image

In the embodiment, the metallic luster is made to appear even, even in a case when an image is viewed diagonally, by making the amount of metallic ink that is ejected per unit area for each region in which a medium on which the image is formed and the line of view when the image is viewed intersect. At this time, predetermined metallic ink dots are thinned out so that the image appears to have a horizontal striped pattern with respect to the line of view when the image is viewed diagonally. For example, when the image is viewed from a vertical angle, and metallic ink dots are thinned out to be horizontal, and when the image is viewed from a horizontal angle, the metallic ink dots are thinned out to be vertical.

As a method of thinning out the metallic ink dots in a striped pattern, there is a method of changing the thinning widths and a method of changing the thinning intervals. For example, in a case when dots are thinned out in a striped pattern as in FIG. 5B, there is a method of reducing the metallic ink amount by making the line widths of the striped portions that are formed by the metallic ink thinner and a method of reducing the metallic ink amount by making the intervals between the lines of the striped portion wider without changing the line widths. Further, when changing the line widths, printing is performed by setting the minimum value of line widths as described above in order to secure a region (line width) of a minimum size for maintaining the metallic luster. In the embodiment, description will be given with the minimum value of the line widths as 1 mm. Details will be described later.

Image Processing of Metallic Image

A specific method of image processing according to the first embodiment will be described. Generally, although there may be a case in metallic printing when a color image is formed along with a metallic image, in the embodiment, description will be given mainly of the image processing of the metallic image.

The flow of the image processing of the metallic image according to the first embodiment is illustrated in FIG. 8. According to the first embodiment, the image processing is performed by executing each of the processes of S101 to S106. Each process is executed based on an order from a printer driver that is installed on the computer 110. Here, the printer driver may be installed on the controller 60 of the printer 1 and the image processing may be performed by the printer 1 itself.

The printer driver receives data of an original image of the metallic image from an application program and outputs the data into print data of a format that the printer 1 is able to interpret. The print data includes data (pixel data) that represents the amount of ink that is ejected for each pixel, and an image composed of many ink dots is formed by causing ink dots to be ejected onto the positions of each pixel from the head unit 40 of the printer 1 according to the print data.

When converting the data of the original image into print data, the printer driver performs a bitmap conversion process, a halftone process, a resolution conversion process, a rasterization process, and the like. Furthermore, the metallic ink dots are thinned out while the thinning rate of the dots is changed according to the gradation value of the original image data by a dot thinning process (S104) described later. The various processes that the printer driver performs will be described below in detail.

Before the start of printing, first, the computer 110 and the printer 1 are connected (refer to FIG. 1), and a printer driver that is stored on a CD-ROM that is provided with the printer 1 (or a printer driver that is downloaded from the home page of the printer manufacturer) is installed on the computer 110. The printer driver is provided with a code for the computer 110 to execute each of the processes of FIG. 8. Here, as described above, it is also possible to install the printer driver on the controller 60 of the printer 1.

When the user instructs printing from the application program and printing is started, the printer driver is invoked, the image data (original image data) that is the printing target is received from the application program (S101), and a bitmap (BMP) conversion process is performed on the image data (S102).

The bitmap conversion process (S102) is a process of converting image data of a vector format which is received from the application program into image data of a bitmap (BMP) format for image data composed of text data, image data, and the like so that each of the processes described later becomes easier to be performed at the pixel unit. At this time, bit map data is generated with a resolution of 1 mm×1 mm so that the minimum unit of regions on which metallic images are formed becomes a size that is approximately 1 mm². Such a 1 mm² region is defined as a virtual pixel. Here, the resolution may be not exactly 1 mm×1 mm but one pixel of a virtual pixel is a region of a similar size to 1 mm². For example, a virtual pixel may be a size such as 24 dpi×24 dpi. As described above, in order to secure a favorable metallic luster for the metallic image, it is necessary to form a metallic image of a region of a size that is a minimum of approximately 1 mm². Therefore, the minimum unit at which the metallic ink dots are ejected is set to a virtual pixel of 1 mm×1 mm. In so doing, it becomes possible to form a metallic image with widths that are at least 1 mm, and the formed metallic image reliably has metallic luster.

Here, the image data after the bitmap conversion process is configured by the data of gradations (for example, 256 gradations) represented by the metallic (Me) color space.

After the bitmap conversion process (S102), the printer driver performs a halftone process (S103). The halftone process is a process of converting higher order gradation data into lower order gradation data that the printer 1 is able to form. Here, metallic image data of 256 gradations is converted into 1 bit data shown two gradations and 2 bit data showing four gradations. A dither method, an error diffusion method, and the like are known as methods of the halftone process, and the embodiment also performs such a halftone process. With image data after the halftone process, data of 1 bit or 2 bits corresponds to each 1 mm×1 mm virtual pixel, and the image data becomes data that shows the formation situation (presence of dots, size of dots) of metallic ink dots in each virtual pixel (region of 1 mm²).

Next, the printer driver performs a dot thinning process (S104) for the image data after the halftone process (S103). The dot thinning process is a process of generating data in which metallic ink is not ejected onto a region that becomes a thinning target by thinning out a portion of the dots (data for forming dots) for many virtual pixels (region of 1 mm²) that configure the metallic image. That is, with the metallic image of the embodiment, an image is formed so that the amount of the metallic ink that is actually ejected is less than the amount of metallic ink that in instructed by the original image data. The dot thinning amount is determined based on information that represents the angle at which the image is viewed (set by the user). A specific method of the dot thinning process (S104) will be described later.

A resolution conversion process (S105) is performed on image data for which the dot thinning process (S104) is complete.

The resolution conversion process (S105) is a process of converting the image data to the resolution (print resolution) of when printing is actually performed. In the embodiment, metallic image data with a resolution of approximately 24×24 dpi is generated by the bitmap conversion process (S102). However, if printing is performed at a resolution of 24×24 dpi, the image becomes very coarse. In particular, in a case when a color image is printed at the same time, the color image is printed with a finer resolution (for example, 720×720 dpi). There is therefore a need to convert metallic image data with a resolution of 24×24 dpi into a resolution of when the metallic image data is actually printed. For example, in a case when the actual print resolution is designated to be 720×720 dpi, image data with a resolution of 24×24 dpi is converted into data with 720×720 dpi.

Figure 9A:
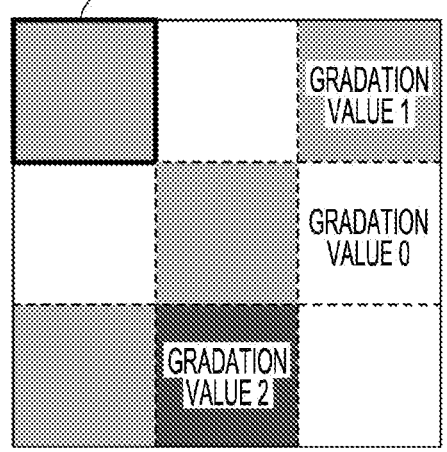
FIGS. 9A and 9B are diagrams that describe the outline of resolution conversion.
Figure 9B:
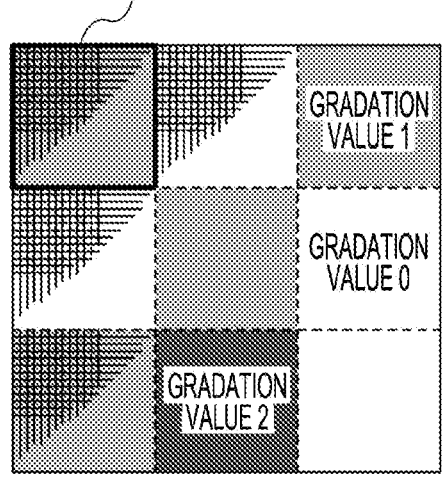

Diagrams for describing the outline of the resolution conversion are illustrated in FIGS. 9A and 9B. FIG. 9A is an example that represents an image of a region for nine pixels that are shown with a resolution of 24×24 dpi. The regions that are demarcated by broken lines respectively represent a pixel (virtual pixel), and such a pixel has a size of approximately 1 mm². Further, the lightly colored pixels represent pixels with a gradation value of 1, the darkly colored pixels represent pixels with a gradation value of 2, and the uncolored pixels represent pixels with a gradation value of 0. The data after the thinning data generation process is in the state illustrated in FIG. 9A.

FIG. 9B is an example in which the data for nine pixels represented by FIG. 9A is converted into a resolution of 720×720 dpi. When 24×24 dpi is converted into 720×720 dpi, the virtual pixel for one pixel becomes the print pixels for 900 (=30×30) pixels. Furthermore, all of the pixel data for the 900 pixels that are converted from one pixel of the virtual pixel represents the same pixel data. For example, in the regions surrounded by a thick line at the top left of FIGS. 9A and 9B, the region for one pixel (FIG. 9A) becomes the region for 900 pixels (FIG. 9B). Furthermore, the gradation values for all of the pixel data for the converted 900 pixels become 1. In so doing, an image with a resolution of 720×720 dpi and the gradation value 1 is printed on a region of a size that is approximately 1 mm².

Finally, the printer driver performs a rasterization process (S106). The rasterization process is a process that changes the order of the pixel data on the image data into the data order by which to be transferred to the printer 1. For example, the pixel data is reordered according to the order of the nozzles of the metallic ink nozzle row. The printer driver then generates print data by adding control data for controlling the printer 1 to the pixel data, and transmits the print data to the printer 1.

The printer 1 performs a printing action according to the received print data. Specifically, the controller 60 of the printer 1 forms an image to be formed on a medium by controlling the head unit 40 according to the pixel data of the print data and causing metallic ink to be ejected from each of the nozzles that are provided on the head 41 while transporting the medium by controlling the transport unit 20 and the like according to the control data of the received print data.

Details of Dot Thinning Process (S104)

Details of the dot thinning process (S104) will be described. As described above, in the embodiment, a portion of the dots are thinned out for each virtual pixel that configures the metallic image based on "the angle between the line of view of the user and the medium (image)", in other words, information that represents "the angle at which the image is viewed" (hereinafter also referred to as viewpoint information). In so doing, the amount of metallic ink that is ejected for each virtual pixel is adjusted, and a metallic image with optimum metallic luster according to the viewing angle is formed. Accordingly, it is necessary to generate data that thins out metallic ink dots from predetermined virtual pixels out of the virtual pixels onto which metallic ink dots are planned to be ejected. Therefore, the printer driver specifies the virtual pixels that are targets for thinning out for the virtual pixel data of the metallic image which is the printing target and actually performs the process of thinning out the dots.

Figure 10:
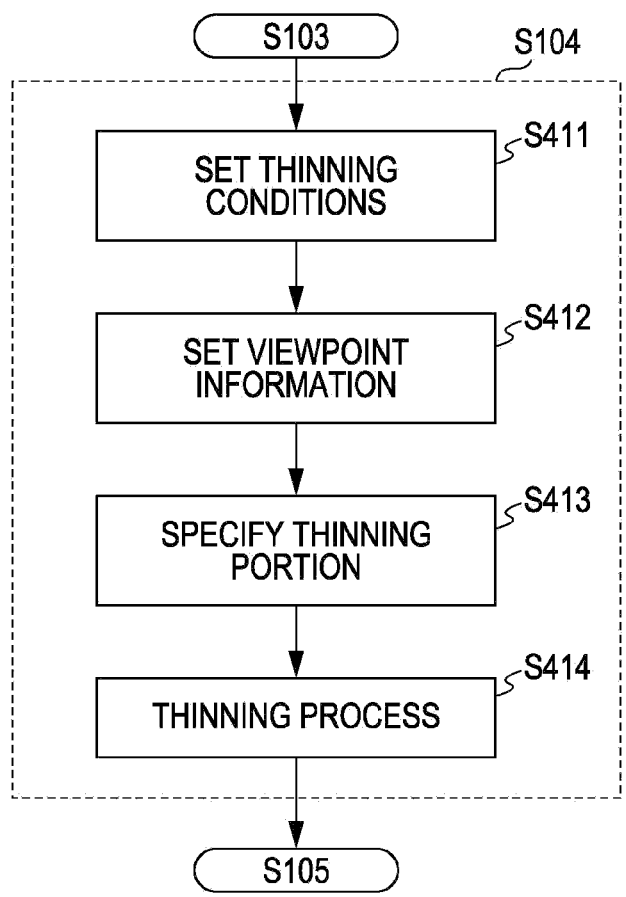
FIG. 10 is a diagram that represents the flow of a dot thinning process according to the first embodiment.

A specific method of the dot thinning process in a case when the thinning pattern becomes the horizontal striped pattern illustrated in FIG. 5B will be described. The flow of the dot thinning process is illustrated in FIG. 10. The dot thinning process (S104) is performed by sequentially executing the processes of S411 to S414.

S411: Setting of Thinning Conditions

First, the thinning pattern of the metallic ink dots is determined by the user. For example, the thinning patterns of FIGS. 5B to 5D are set in advance, and the user is able to select the desired thinning pattern via a user interface (not shown). Here, the striped pattern (refer to FIG. 5B) is selected. The printer driver automatically adjusts the dot thinning widths and the dot thinning intervals based on the viewpoint information that is set in the next process. Here, setting of the thinning conditions (S411) may be performed at the state immediately after the start of printing.

S412: Setting of Viewpoint Information

Next, the viewpoint information is set by the user as information that represents "the angle with which the image is viewed". In the embodiment, in order to form a metallic image for which the metallic luster and the feel appear the same as the original image even in a case when the image after printing is viewed from a diagonal angle, the dot thinning amount is changed according to the viewpoint information. Here, the setting of the viewpoint information (S412) may be performed at a stage immediately after the start of printing or may be performed before the setting of the thinning conditions (S411).

Figure 11:
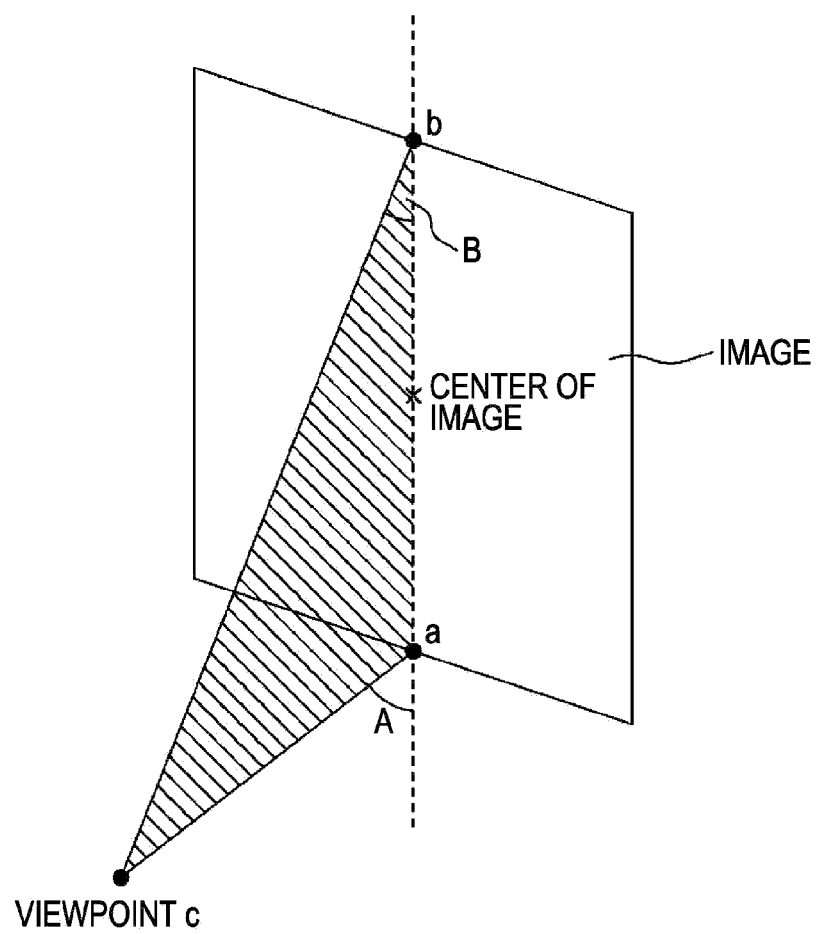
FIG. 11 is a diagram that describes the settings of viewpoint information.

A diagram that describes the setting of the viewpoint information is illustrated in FIG. 11. When the viewpoint is on a flat plane that passes through the center of the image as in the drawing, the portion of the image which is closest to the viewpoint (image bottom end in the drawing) in the vertical direction of the image is point a, the portion of the image which is furthest from the viewpoint (image top end in the drawing) is point b, and the viewpoint is point c. Further, the angle between a straight line that connects point c with point a (line of view) and the printing face of the image is A, and the angle between a straight line that connects point c with point b (line of view) and the printing face of the image is B.

The user sets the distance from point c to point a and the angle A or the distance from point c to point b and the angle B as viewpoint information via a user interface (not shown). Here, the distance between a and b is calculated from the original image data. In a triangle formed by point a, point b, and point c in FIG. 11 (triangle illustrated by shading), since two sides and the angle therebetween is clear, the positional relationship between the viewpoint when the image is viewed and the image is specified. The set viewpoint information is used in the specifying of the thinning portions in the next process (S413). Here, data other than that described above may be treated as viewpoint information if the data is able to specify the positional relationship between the viewpoint and the image. For example, the two angles of angle A and angle B may be set as the viewpoint information, or the angle between the distance from the viewpoint to the central portion of the image and the image may be set as the viewpoint information.

S413: Specifying of Thinning Portions

Next, the printer driver specifies the portions (virtual pixels) of the metallic image that become the thinning target (S413).

The specifying of the thinning portions is performed by adjusting the dot thinning amount for each virtual pixel based on the viewpoint information set in S412 with the thinning pattern set in S411 as the reference. At this time, if the angle between the line of view and the image is small, the thinning portions are specified so that the amount of dot thinning in such a region increases. For example, in a case when performing dot thinning in a striped pattern for the image of FIG. 11, since the angle of point b is smaller than that of point a (A>B), adjustment is made so that point b has a greater dot thinning amount. Specifically, the dot thinning amount is adjusted by making the line widths of the striped portions thin and specifying the thinning pixels so that the intervals between adjacent stripes are widened.

Figure 12A:
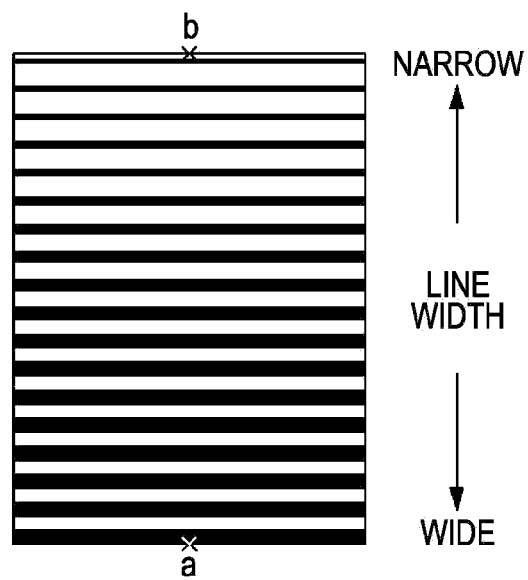
FIG. 12A is a diagram that represents an example of a metallic image in a case when the widths of dot thinning are changed based on the same viewpoint conditions as FIG. 7A.
Figure 12B:
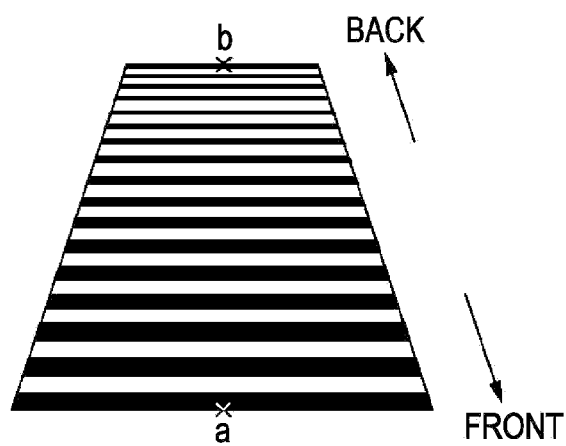
FIG. 12B is a diagram that represents the state of an image that is visible in a case when the metallic image after changing is actually viewed from the same viewpoint.

A specific example in a case when the line widths of the striped portions are changed according to the viewpoint information is illustrated in FIGS. 12A and 12B. FIG. 12A represents an example of metallic image in a case when widths of dots thinned out are changed, based on the condition of the viewpoint same as the FIG. 7A. FIG. 12B represents the state of the image that is perceived in a case when the metallic image after being changed is actually viewed from the viewpoint. In the embodiment, the dot thinning amount is adjusted so that the size of the angle between the line of view and the image (for example, angle A or angle B in FIG. 11) and the line widths of the metallic image of such a portion after being thinned out are proportional. In FIG. 12A, since the further up the image from point a at the bottom end of the image, the smaller the angle between the line of view and the image, the dot thinning portions are specified so that the line widths of the metallic image in the higher regions are also thinner. Furthermore, since the angle is the smallest at point b at the top end of the image, somewhat more dot thinning portions are specified so that the line widths become the smallest in such a region. Here, adjustment of the thinning amount is performed during viewpoint conditions in which the line of view with respect to the image becomes diagonal (refer to FIG. 7A) such as in a case when the image is viewed from below. Therefore, in a case when the angle between the line of view and the image is 90 degrees as in FIG. 6A, adjustment of the line widths and the like is not necessary, adjustment of the dot thinning amount is not performed, and the dots are thinned out according to the thinning conditions set in S411.

As a result, as illustrated in FIG. 12B, compared to FIG. 7B, the image that is actually perceived appears to have wider intervals between the striped of the image at the back portions (upper portions of the image). Since the differences in the intervals between the stripes between the front portions (lower portions of the image) and the back portions (upper portions of the image) are hard to recognize, the reflected light appears uniform, and the image as a whole appears to have an even metallic luster.

Figure 13A:
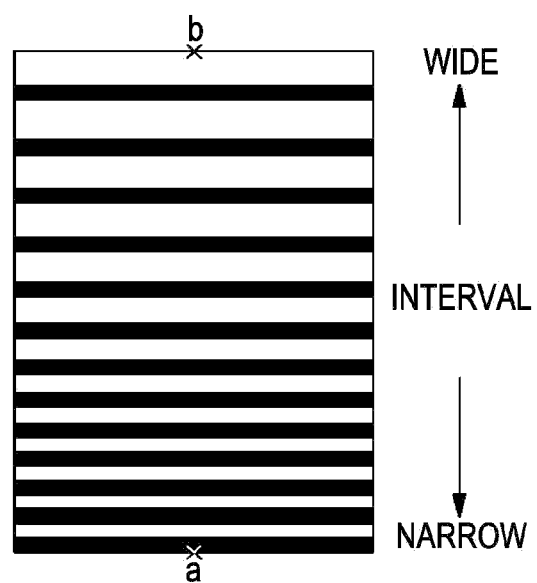
FIG. 13A is a diagram that represents an example in a case when the intervals of dot thinning are changed based on the same viewpoint conditions as FIG. 7A.
Figure 13B:
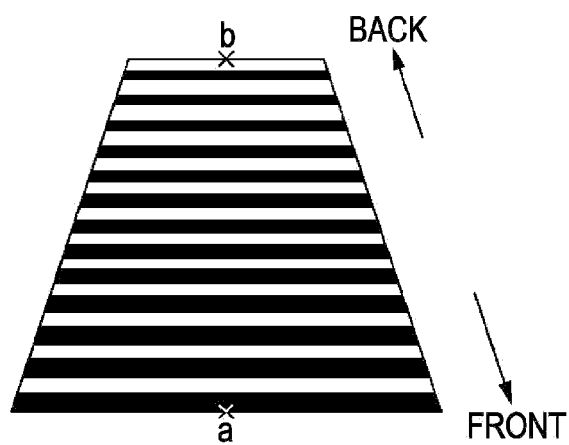
FIG. 13B is a diagram that represents the state of an image that is visible in a case when the metallic image after changing is actually viewed from the same viewpoint.

An example in a case when the intervals of the striped portions are changed according to the viewpoint information is illustrated in FIGS. 13A and 13B. FIG. 13A represents an example of metallic image in a case when intervals of dots thinned out are changed, based on the condition of the viewpoints same as the FIG. 7A. FIG. 13B represents the state of the image that is perceived in a case when the metallic image after being changed is actually viewed from the viewpoint. In such a case, the dot thinning amount is adjusted so that the size of the angle between the line of view and the image (for example, angle A or angle B in FIG. 11) and the intervals between the lines of the metallic image of such a portion after being thinned out are inversely proportional. In FIG. 13A, since the further up the image from point a at the bottom end of the image, the smaller the angle between the line of view and the image, the dot thinning portions are specified so that the line widths of the metallic image in the higher regions are also thinner. Furthermore, since the angle is the smallest at point b at the top end of the image, somewhat more dot thinning portions are specified so that the line widths become the smallest in such a region.

As a result, as illustrated in FIG. 13B, compared to FIG. 7B, the image that is actually perceived appears to have wider intervals between the striped of the image at the back portions (upper portions of the image). Similarly to the case of FIG. 12B, since the differences in the intervals between the stripes between the front portions (lower portions of the image) and the back portions (upper portions of the image) are hard to recognize, the reflected light appears uniform, and the image as a whole appears to have an even metallic luster.

Here, in a case when a lattice pattern (FIG. 5C) or a checkered pattern (FIG. 5D) are set as the thinning pattern in S411, similarly to the line-like pattern described above, the line widths and the intervals are changed for the upper portions and the lower portions (perspective direction when viewing the image).

In such a manner, the metallic ink amount that is ejected per unit area is adjusted by changing the thicknesses of the lines and the intervals between the lines at portions to which metallic ink is ejected according to the viewpoint information when the image is viewed, and a metallic image for which the metallic luster appears even when viewed from the viewpoint is formed. However, as described above, it is necessary for the metallic image portion to have a region of a minimum size (1 mm$^2$ in the example described above) in order to form an image with metallic luster. Therefore, even in a case when the line widths are changed as in FIG. 12A, the lower limit value of the line widths must be the width of the virtual pixel set in S102 (1 mm in the example described above).

S414: Thinning of Specified Pixel Data

The gradation value of the metallic ink (Me) of the image data after the halftone process is changed to zero for the virtual pixels that are specified as the thinning target portions in S413. In so doing, metallic print data composed of a virtual pixel row for which the Me gradation value is not zero (virtual pixel row to which the metallic ink is ejected) and a virtual pixel row for which the Me gradation value is zero (virtual pixel row that is specified as the thinning target) is obtained.

Effects of First Embodiment

In the first embodiment, the amount of metallic ink that is ejected per unit area is changed based on information (viewpoint information) that represents the angle between the line of view of the user when viewing the metallic image and the image. Specifically, the amount of metallic ink that is ejected per unit area of the medium is reduced by increasing the thinning amount of the metallic ink dots for smaller angles. At this time, the dots are thinned out so that the region to which the metallic ink is ejected becomes equal to or greater than a predetermined width.

In so doing, it becomes possible to form a favorable metallic image with no unevenness in the metal luster or feel even in a case when the angle when viewing the image is a diagonal. In addition, by thinning out the metallic ink dots, it is possible to reduce the amount of metallic ink used in printing, and to keep cost of the printing low.

SECOND EMBODIMENT

In the second embodiment, when forming a metallic image by metallic ink (Me) and a color image by color ink (KCMY) at the same time in metallic printing, printing is performed so that there are portions where the metallic image and the color image overlap. The configuration of the printer used for the printing is the same as in the first embodiment.

Printing Target Image

Figure 14:
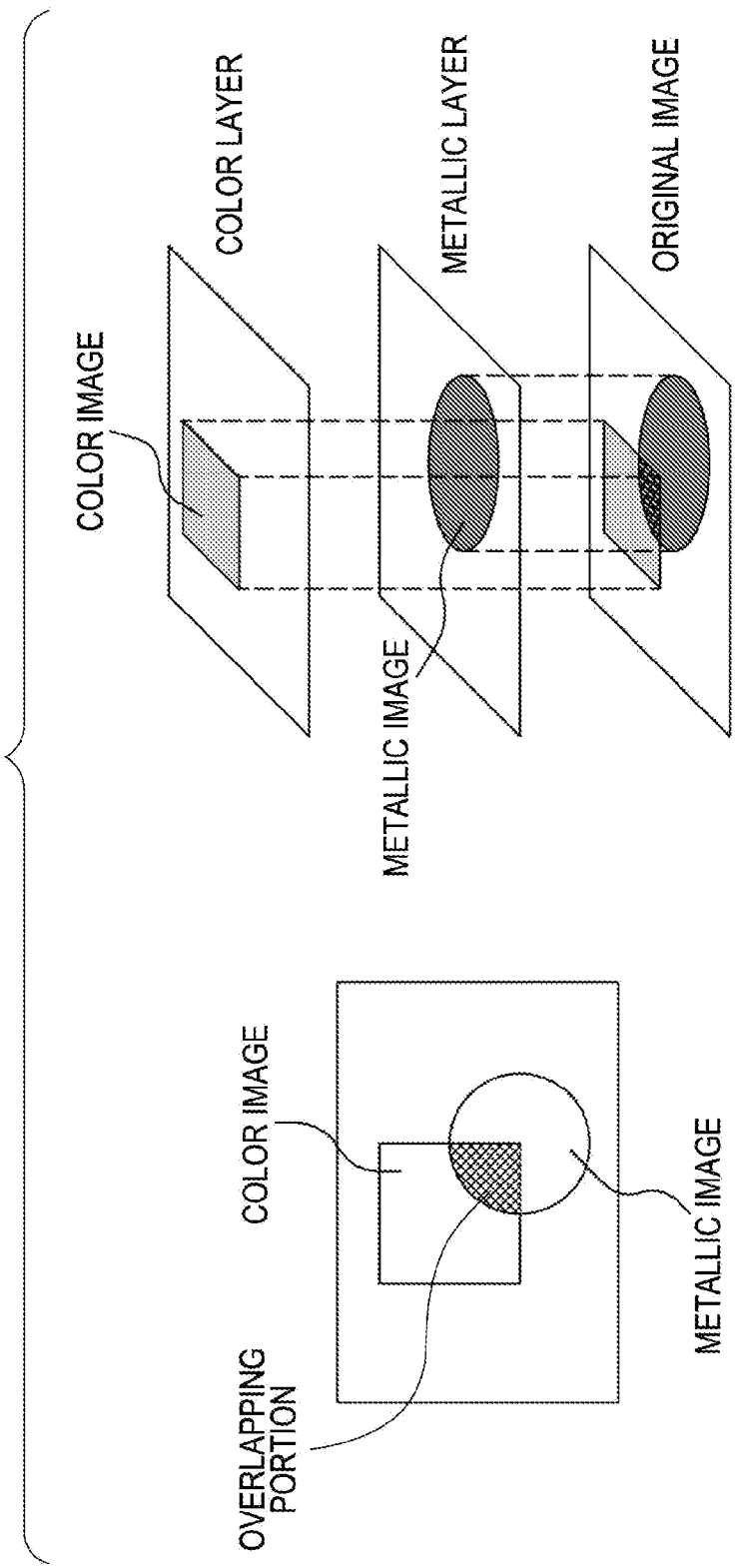
FIG. 14 is a diagram that represents an outline diagram of an image that is the printing target according to a second embodiment.

An outline diagram of an image that is the printing target in the second embodiment is illustrated in FIG. 14. As illustrated in the drawing on the left side of FIG. 14, an image (original image) that becomes the printing target in the embodiment includes a metallic image portion (circular portion) that is printed with metallic ink and a color image portion (rectangular portion) that is printed with color ink. Furthermore, the image is configured so that both images overlap on the region represented by the shaded portion. Here, the color image is represented by the three colors of RGB (RGB respectively represents each color of red (R), green (G), and blue (B)), and during printing, the color image is printed by color ink of the four colors of KCMY (KCMY respectively represents each color of black (K), cyan (C), magenta (M), and yellow (Y)).

For the sake of description, the original image is considered to be divided into two levels of a level on which the metallic image is formed (metallic layer) and a level on which the color image is formed (color layer). Here, while the color layer is actually able to be divided into images with the three colors of RGB, below, the color layer will be described as being configured by a color image of one color. As illustrated in the drawing on the right side of FIG. 14, an image (original image) that is the printing target is formed by overlapping the metallic layer and the color layer.

In a case when there is a region in which the color image and the metallic image overlap, first, the metallic image is formed on the medium by first performing printing of the metallic layer. Furthermore, a method of overlapping a color image that is shown by a color layer over the metallic image after forming the metallic layer is common. By performing printing in such a manner, it is possible to express a metallic color (for example, metallic blue, metallic red, and the like) on the overlapping portion between the color image and the metallic image.

On the other hand, in the embodiment, printing is performed so that the metallic ink and the color ink are not ejected onto the same pixels in the overlapping portion. That is, printing is performed in which the metallic ink dots and the color ink dots that are formed on the medium do not overlap at the pixel unit.

With common metallic printing, since the metallic image and the color image are formed in order, there is a need to sufficiently dry the image that is formed first before forming the next image, making the time taken to complete printing long. However, with the embodiment, by ejecting ink so that the ink dots do not overlap one another in the overlapping portion of the metallic image and the color image, it is possible to form the metallic image and the color image at the same time in one printing operation. In so doing, it is possible to shorten the time taken to print compared to the related art.

Image Processing of Metallic Image

The basic flow of performing image processing of the metallic image is similar to the description of the first embodiment in FIG. 8. However, with the embodiment, since the ink dots are made to not overlap one another in the overlapping portion (hereinafter also referred to as the overlapping region) of the color image and the metallic image, the processes of the dot thinning process (S104) are different. The dot thinning process (S104) in the overlapping portion will be described below centered on the differences with the embodiment described above.

Details of Dot Thinning Process in Overlapping Region

As described above, in the embodiment, simultaneous printing of the metallic image and the color image is realized by making the metallic ink (Me) and the color ink (KCMY) not be ejected onto the same pixels on the medium in the overlapping region of the metallic image and the color image. There is therefore a need to thin out the print data of the color ink dots for pixels onto which metallic ink dots are due to be ejected, and conversely to thin out the print data of the metallic ink dots for pixels onto which color ink dots are due to be ejected.

Figure 15:
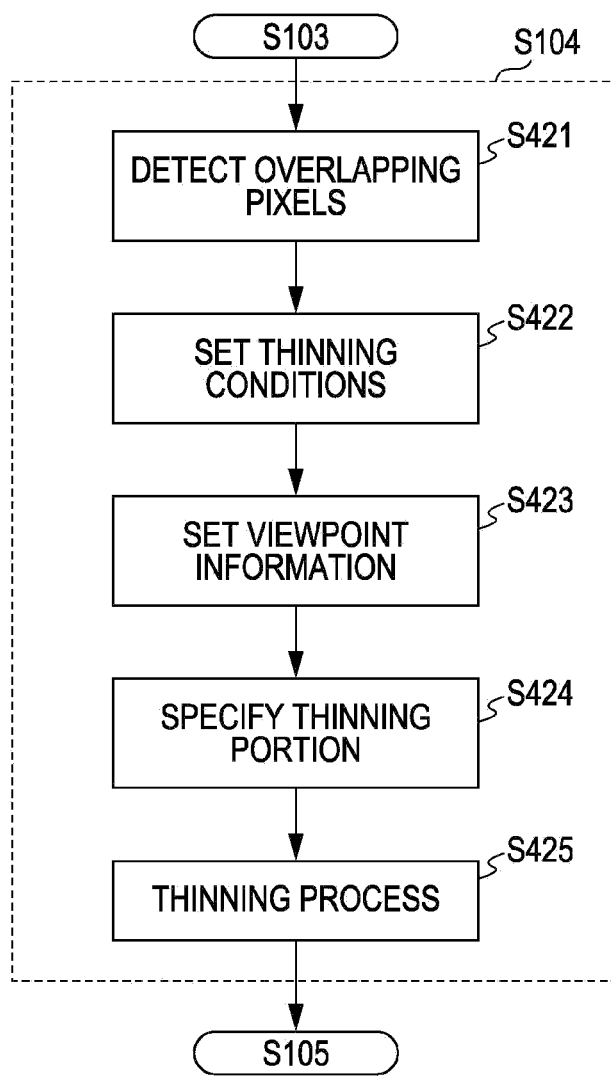
FIG. 15 is a diagram that represents the flow of a dot thinning process according to the second embodiment.

The flow of the specific processes of the dot thinning process according to the second embodiment is illustrated in FIG. 15. The dot thinning process (S104) is performed by sequentially executing each of the processes of S421 to S425.

First, detection of an overlapping region (overlapping pixels) is performed (S421) by determining whether or not there is an overlapping region of the metallic image and the color image in the original image. Even if the original image includes a metallic image and a color image, if a region (pixels) that overlaps each other is not detected, similarly to the first embodiment, a dot thinning process is performed only for the metallic image portion. On the other hand, in a case when there are overlapping pixels, a process for thinning out predetermined dots of the respective image data of the metallic image and the color image after such a region is detected.

Here, the metallic image and the color image "overlapping" refers to a case when the positions of the pixels that indicate the metallic image in the metallic layer (pixels for which the gradation value is not zero in terms of Me) and the positions of the pixels that indicate the color image in the color layer (pixels for which the gradation value is not zero in terms of at least one of the colors of KCMY) overlap one another. For example, if the Me gradation value is 128 and the Y gradation value is 256 for a given pixel A, the metallic image and the color image are overlapping for the pixel A. Further, if the Me gradation value is 64 and the KCMY gradation values are all 0 for a given pixel B, the metallic image and the color image are not overlapping for the pixel B.

The printer driver performs detection of overlapping pixels of the metallic image and the color image by comparing the gradation value of Me and the gradation value of KCMY for each pixel from the metallic image data and the color image data after a halftone process. In a case when overlapping pixels are detected, the positional information of the overlapping pixels are temporarily saved in the memory 63, and the process proceeds to the setting of the thinning conditions (S422) that is the next process.

The same dot thinning conditions as S411 in FIG. 10 described above are set for the metallic image portion of the detected overlapping region (S422). Furthermore, after the setting of the thinning conditions, similarly to S412 of FIG. 10 described above, setting of the viewpoint information is performed (S423). Such processes may be performed at the start of printing.

In the second embodiment, specifying of the pixels that are the thinning targets is performed for each of the metallic image data of the metallic layer and the color image data of the color layer (S424), and the thinning process of the image data is actually performed (S425). Predetermined pixels (virtual pixels) out of the pixels (virtual pixels) that configure the overlapping region detected in S421 become the thinning targets. The specifying of the thinning target portion with regard to the metallic image data is the same as in the first embodiment, and in a case when dots are thinned out as a striped pattern, for example, the line widths of the striped portions are made thin and the intervals between the stripes are widened for regions in which the angle between the line of view and the image is small.

In addition, in the embodiment, since print data in which the metallic ink and the color ink are not ejected onto pixels in the same position in an overlapping manner is generated, it is necessary to thin out pixels at positions that differ between the metallic image data and the color image data. For example, in a case when a virtual pixel C at a predetermined position within an overlapping region with a color image in a metallic image is specified as a thinning target, there is no need to thin out a pixel C' at the same position in the color image. Similarly, in a case when a pixel D' at a predetermined position within an overlapping region with a metallic image in a color image is specified as a thinning target, there is no need to thin out a virtual pixel D at the same position in the metallic image. That is, if it is possible to specify the pixels that become the thinning target for the image of either the metallic image or the color image, it is possible to specify the pixels that become the thinning target for the other image.

Figure 16A:
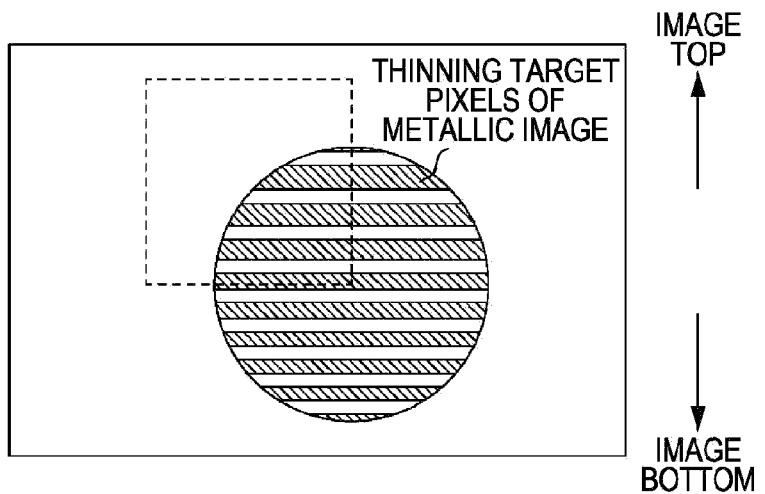
FIGS. 16A to 16C are diagrams that describe a method of specifying thinning pixels in a striped pattern according to the second embodiment.
Figure 16B:
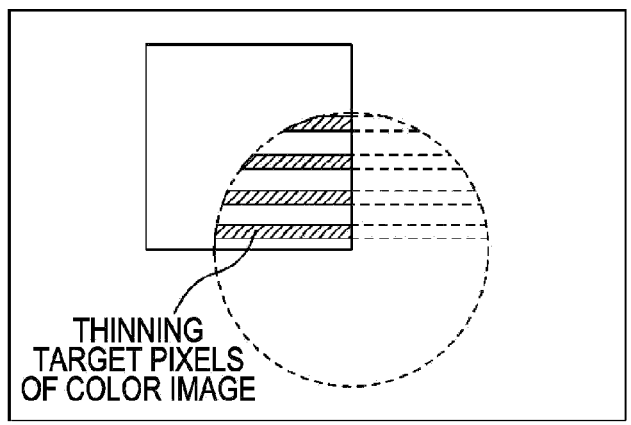
Figure 16C:
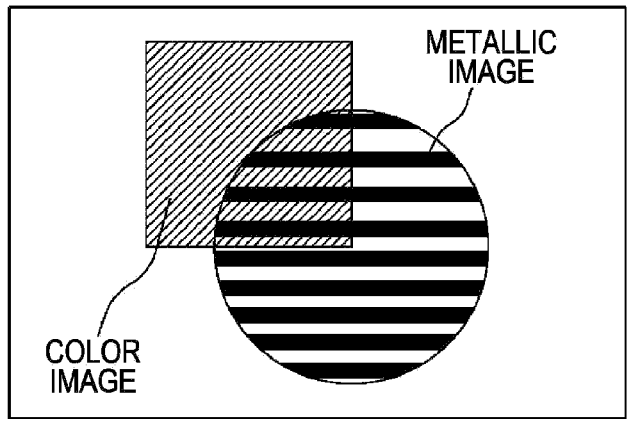

Here, an example of a case when the print data of a striped thinning pattern is generated will be described. FIGS. 16A to 16C are diagrams that describe a method of specifying the thinning pixels in a striped pattern.

FIG. 16A is a diagram that specifies the thinning target pixels of the metallic image. Similarly to S413 of FIG. 10, the printer driver specifies the virtual pixels that are the thinning target while changing the dot thinning amount for each region based on "the angle at which the image is viewed" that is set by the viewpoint information for each of the virtual pixels that configure a region that overlaps the color image in the metallic layer. As a result, out of the metallic image illustrated in FIG. 16A, the portions represents by the diagonal lines are specified as the thinning target pixels of the metallic image.

Thereafter, for each of the pixels that configure a region that overlaps the metallic layer in the color layer, all pixels other than the virtual pixels that are specified as the thinning target in the metallic image (pixels specified by the diagonal line portions in FIG. 16A) are specified as the thinning target. The portions represented by the diagonal lines out of the color image illustrated in FIG. 16B are the thinning target pixels of the color image. In other words, all of the portions that are specified as virtual pixels onto which the metallic ink is ejected in the overlapping region are specified as the thinning target pixels of the color image. In so doing, color image data in which the overlapping region becomes a striped pattern (pattern in which the striped pattern of the metallic image is inverted) is obtained.

Furthermore, by combining such data, image data in which the positions of the virtual pixels onto which the metallic ink dots are ejected and the positions of the pixels onto which the color ink dots are ejected in the overlapping region do not overlap (FIG. 16C) is obtained.

A resolution conversion process (S105) and the like are then performed on the image data of the metallic image, and the final print data is generated. By respectively ejecting metallic ink and color ink according to the generated print data, an image in which the metallic image and the color image have an overlapping portion is printed.

Image Processing of Color Image

Here, image processing of the color image in the color layer will be briefly described for reference.

The flow of image processing of the color image is illustrated in FIG. 17. The image processing is performed by executing each of the processes of S501 to S506. Each process is executed based on an instruction from the printer driver.

The image processing of the color image differs from the image processing of the metallic image (refer to FIG. 8) in that the bitmap conversion process (S102) and the print resolution conversion process (S105) are performed at the same time as a resolution conversion process (S502), and further, a color conversion process (S503) is performed. The differences will be described below.

With the image processing of the color image, since there is no need to secure a metallic luster unlike with the metallic image, a minimum width of the image does not have to be set. There is therefore no need to convert the original image data into a resolution that is 1 $mm^2$ as in the process of the metallic image processing (S102). Instead, conversion to a resolution of 720×720 dpi that is the print resolution is performed (S502).

Further, a color conversion process is performed (S503) in order to represent the color image data that is configured by RGB by the color ink of KCMY. In so doing, the image data of the RGB color space is converted into image data of KCMY color space. The color conversion process of the color image is performed based on 3D-LUT in which the gradation values of the RGB data is associated with the gradation values of the KCMY data. The image data after the color conversion process is 8 bit data with 256 gradations that are represented by the KCMY color space. Here, since the metallic ink color (Me) is not able to be represented by the combination of KCMY and is treated as a special color, a color conversion process is not performed for the metallic ink (refer to FIG. 8).

Furthermore, a dot thinning process of thinning out a portion of the pixel data is performed (S505) for the data after a halftone process (S504). As described above, in the dot thinning process, the pixels onto which the metallic ink is due to be ejected are specified as the thinning target pixels of the color ink in overlapping portions with the metallic image, and the gradation values of the specified pixels are changed to zero.

Other basic processes and flow are the same as the image processing of the metallic image. Furthermore, the color image is formed by ejecting the color ink based on the print data that is finally generated.

Effects of Second Embodiment

In the second embodiment, in a case when performing overstrike printing in which there are portions where the metallic image and the color image overlap, the pixels onto which the color ink is ejected out of the color image data and the pixels onto which the metallic ink is ejected out of the metallic image data are made to not overlap. That is, the color ink dots and the metallic ink dots are made not to be ejected onto the same pixels. Furthermore, in the metallic printing portions, printing of a metallic image in which unevenness with regard to the metallic luster and the like is not easily seen is performed by adjusting the dot thinning amount according to the viewpoint information while maintaining the minimum width.

According to the printing method of the embodiment, metallic colors such as metallic blue are able to be expressed by a metallic image with a favorable metallic luster according to the angle or the distance at which the image is viewed. Furthermore, even in a case when the metallic image and the color image overlap, printing of the metallic image and printing of the color image are able to be performed at the same time. In so doing, the print time is able to be made shorter than in a case when the color image and the metallic image are printed in order, and it is possible to print a high quality metallic image.

THIRD EMBODIMENT

In the third embodiment, similarly to the second embodiment, the gradation expression of the metallic image is changed by overlapping and printing the color image and the metallic image so that the optimum metallic luster is obtained according to information (viewpoint information) that represents "the angle at which the image is viewed" while taking the "color" of the color image into consideration.

Specifically, the dot thinning amount of the metallic image is changed by taking the deepness of the color of the color image at portions that overlap with the metallic image into consideration. For example, the color tone of the metallic image appears differently between a case when the metallic image is printed by being overlapped with a dark color such as cyan (C) and a case when the metallic image is printed by being overlapped with a pale color such as yellow (Y). Therefore, a metallic image that is easier to see is printed by adjusting the total amount of the metallic ink that is ejected by changing the amount by which the metallic ink dots are thinned out from the metallic image to match the darkness (gradation value) of the color of the color image.

In the embodiment, the processes of the dot thinning process (S104 of FIG. 8) are different from each of the embodiments described above. Other processes and the image forming apparatus that is used are the same as the second embodiment.

Figure 18:
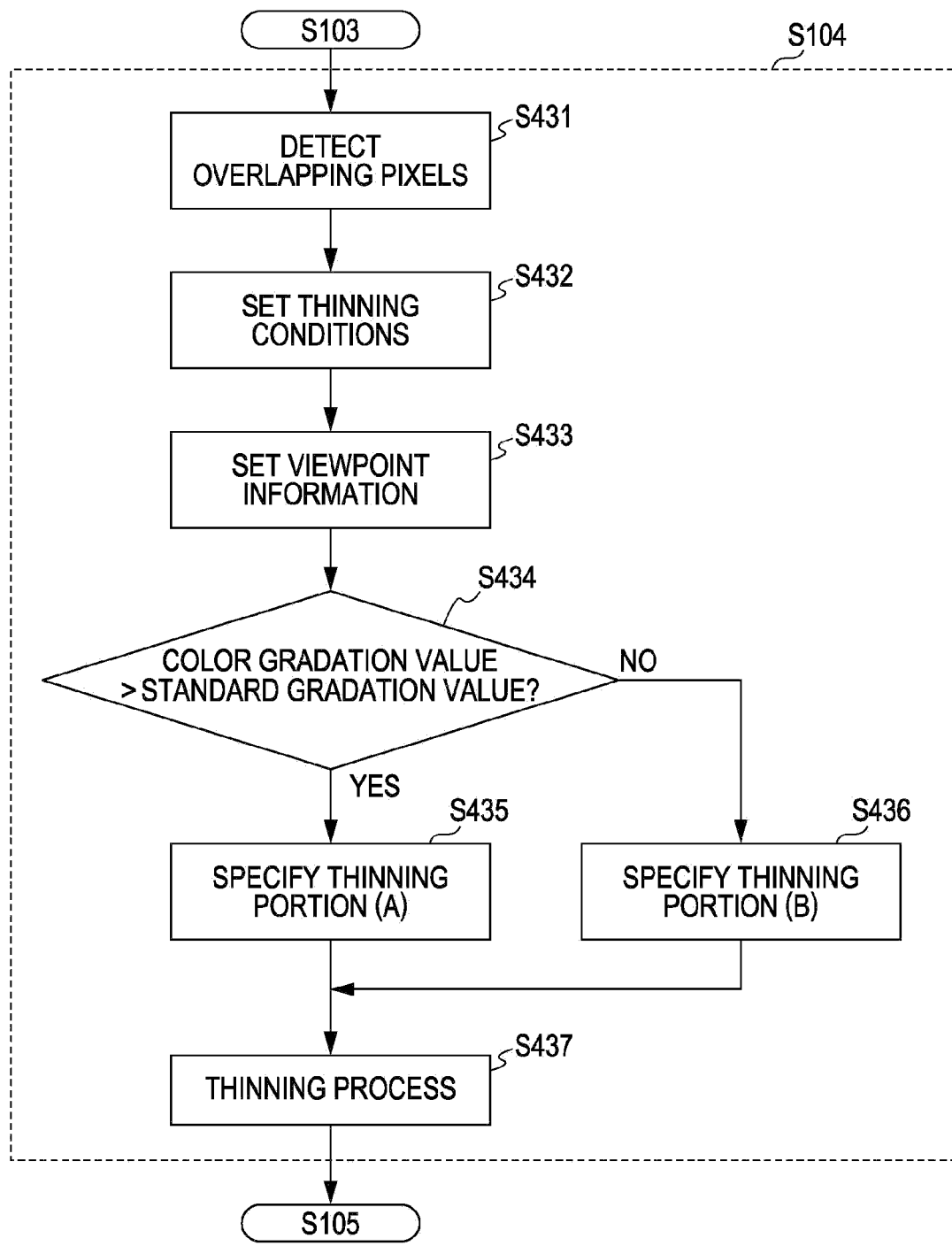
FIG. 18 is a diagram that represents the flow of a dot thinning process according to a third embodiment.

FIG. 18 is a diagram that represents the flow of the dot thinning process of the third embodiment. First, similarly to the description of the second embodiment, pixels that overlap between the metallic image and the color image are detected (S431). Next, setting of the thinning conditions (S432) and setting of the viewpoint information are performed (S433).

Next, the gradation values of the color image and predetermined standard gradation values that are set for each of the colors of KCMY are compared (S434). The gradation values of the color image are ascertained by calculating the average gradation value of all the pixels that form the color image (hereinafter also referred to simply as color gradation values) for each color. Here, the calculation of the color gradation values may be a method of calculating only the pixels that form the overlapping region out of the color image.

The standard gradation values are determined in advance and stored in the memory 63. The standard gradation values are set for each color such as, for example, 128 for the standard gradation value of C and 192 for the standard gradation value of Y. The levels of such standard gradation values may be changed by the user via a user interface after verifying the actual print results.

The printer driver calculates the color gradation values from the image data and performs a comparison with the standard gradation values that are stored in the memory 63. In a case when the color gradation values are higher than the standard gradation values, the process proceeds to (A) the process of specifying the thinning portions (S435), and the dots are thinned out (S437). In a case when the color gradation values are equal to or less than the standard gradation values, the process proceeds to (B) the process of specifying the thinning pixel portions (S436), and the dots are thinned out (S437).

In a case when the color gradation values are equal to or less than the standard gradation values, that is, when the color image has a pale color, the metallic image that is printed by overlapping with the color image is not easily influenced by the color image. At such a time, specifying of the thinning portions similar to the specifying of the thinning portions of the second embodiment (S424) is performed (S436). On the other hand, in a case when the color gradation values are higher than the standard gradation values, that is, when the color image is a dark color, there is a concern that the metallic image that is printed by overlapping with the color image may be influenced by the color image and the color tone may appear dark. The influence of the color image is therefore reduced by making the proportion of the metallic ink in the overlapping portion high. That is, by making the thinning portions smaller than the thinning portions that are specified in S436, the color of the metallic image is preventing from becoming dark (S435). At this time, the adjustment of the thinning portion is performed, for example, by changing the line widths of the striped portions or widening the intervals between the stripes.

Here, in S434, there may be a method of setting a plurality of types of standard gradation values gradually and changing the proportion of the thinning amount of the metallic image according to the levels of the calculated color gradation values.

Effects of Third Embodiment

In the third embodiment, in a case when the average of the gradation values of the pixels that configure the color image is less than predetermined standard gradation values when performing overstrike printing with an overlapping portion between the metallic image and the color image, the amount of metallic ink that is ejected to the overlapping portion is reduced.

According to the method of the embodiment, it is possible to print a metallic image with a favorable metallic luster according to the angle or the distance at which the image is viewed. Furthermore, by adjusting the thinning amount of the metallic ink dots according to the gradation values of the color portions of the image, it is possible to print a metallic image that is easier to see.

FOURTH EMBODIMENT

In a fourth embodiment, an image is printed on a medium using ultraviolet curable ink (hereinafter, UV ink) that is cured by irradiating light such as ultraviolet radiation (hereinafter, UV). UV ink is ink that includes an ultraviolet curable resin, and is cured by a photopolymerization reaction that occurs in the ultraviolet curable resin when UV radiation is received.

In the embodiment, printing is performed using a printer 2. The printer 2 includes a UV irradiation unit 70 for curing UV ink dots by irradiating UV. Hereinafter, points that differ from the printer 1 according to the embodiments described above will be described.

Configuration of Printer 2

Figure 19:
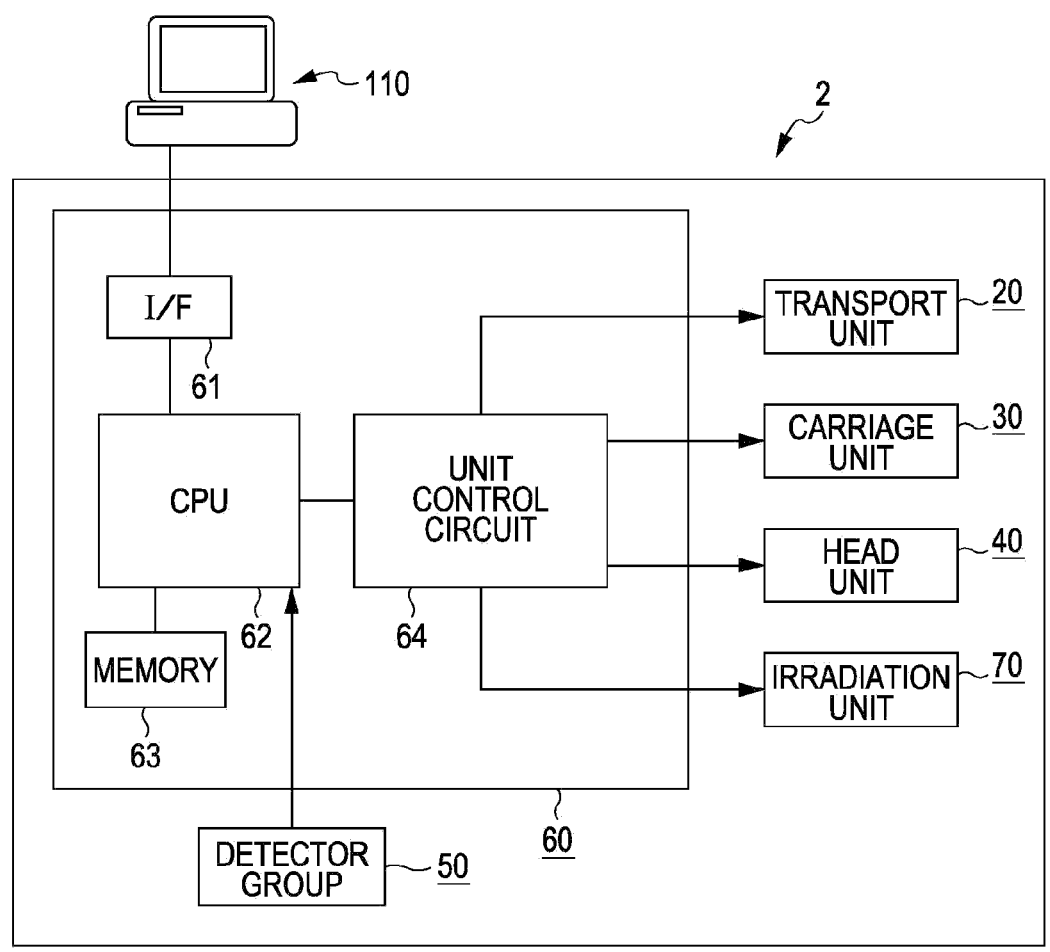
FIG. 19 is a block diagram that illustrates the overall configuration of a printer.
Figure 20A:
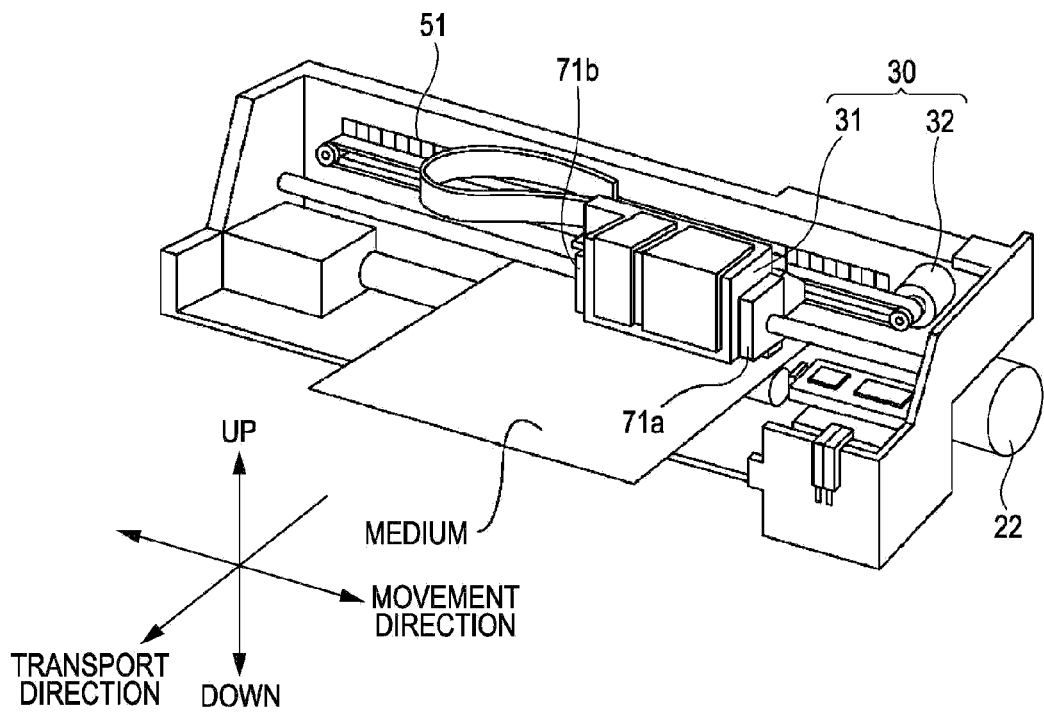
FIG. 20A is a bird's eye view that represents the configuration of the printer.
Figure 20B:
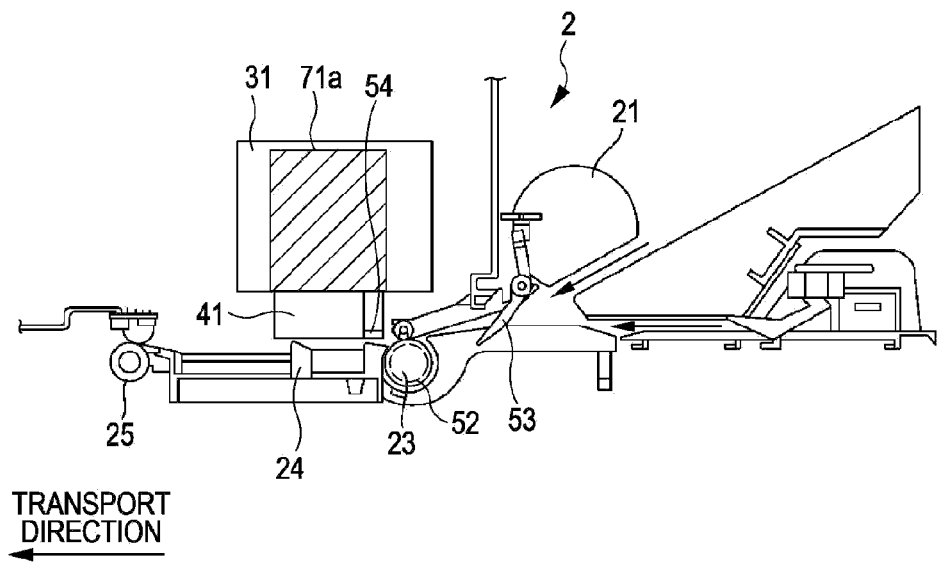
FIG. 20B is a side view that describes the configuration of the printer.

FIG. 19 is a block diagram that illustrates the overall configuration of the printer 2. FIG. 20A is a bird's eye view that represents the configuration of the printer 2, and FIG. 20B is a side view diagram that represents the configuration of the printer 2.

The printer 2 includes the transport unit 20, the carriage unit 30, the head unit 40, the detector group 50, the controller 60, and the irradiation unit 70. Each of the configurations other than the irradiation unit 70 and the unit control circuit 64 is the same as the printer 1.

Irradiation Unit 70

The irradiation unit 70 irradiation UV toward UV ink dots that have landed on the medium. The dots that are formed on the medium are cured by receiving UV irradiation from the irradiation unit 70. The irradiation unit 70 of the embodiment includes irradiation portions 71a and 71b. The irradiation portions 71a and 71b are respectively provided on the outside of both ends of the carriage 31 (refer to FIGS. 20A and 20B). In so doing, the configuration is such that even ink that is ejected while the carriage 31 moves in either direction from one end side to the other end side or from the other end side to the one end side is able to be irradiated by UV.

The irradiation portions 71a and 71b include a light emitting diode (LED) as a light source of the UV radiation. An LED with a wavelength peak of approximately 395 nm is used. The LED is easily able to change the irradiation energy by controlling the size of the input current. Here, a light source other than an LED (for example, a metal halide lamp or the like) is able to be used if the light source has a sufficient irradiation output and is mountable on the carriage 31.

Printing Actions of Printer 2

The printing actions of the printer 2 will be described briefly. The controller 60 forms ink dots by performing the same paper feeding process, dot formation process, transport process, and the like as the printer 1 and by further performing a UV irradiation process.

In the embodiment, in the dot formation process, the dots are cured by irradiating UV from the irradiation unit 70 during the same scan as ink dots that are ejected while the head 41 (carriage 31) moves (scans) in the movement direction (UV irradiation process). That is, ejection of the UV ink and UV irradiation are performed during the process of the carriage 31 moving from one side to the other side in the movement direction. The controller 60 is able to adjusting the curing state of the ink dots that have landed on the medium by controlling the UV irradiation output and the UV irradiation timing in the UV irradiation process.

Curing of UV Ink Dots

The shapes of the UV ink dots change after landing as time passes. Diagrams that describe the state of the changes to the shapes of the ink dots are illustrated in FIGS. 21A to 21C.

Figure 21A:
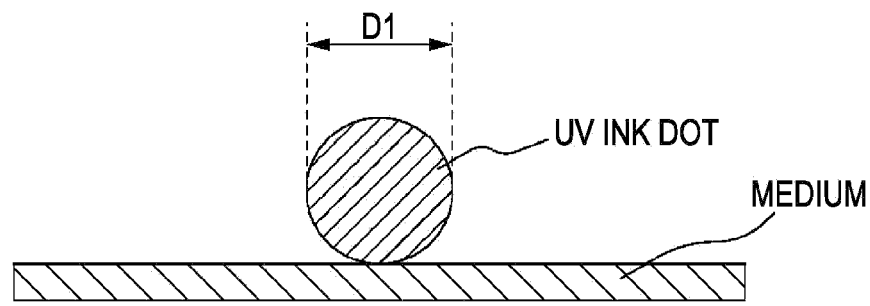
FIGS. 21A to 21C are diagrams that describe the state of changes to the shapes of the ink dots.
Figure 21B:
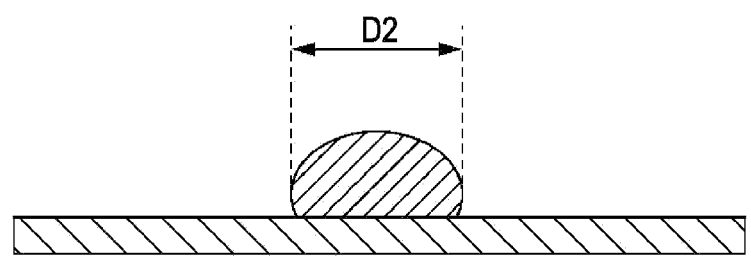
Figure 21C:
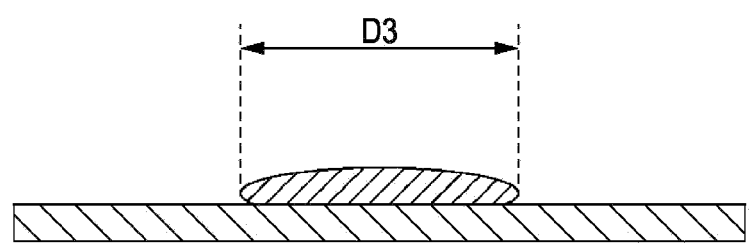

An ink dot immediately after landing on the medium is ideally the spherical dot as in FIG. 21A. Here, the dot diameter is D1. The UV ink dot then flattens and gradually spreads out due to its own weight as time passes, and becomes the somewhat flattened dome shape of FIG. 21B. At this time, the dot diameter is D2 (D2>D1). After more time has passed, the dot spreads even further than in FIG. 21B, and becomes the flattened disk shape of FIG. 21C. At this time, the dot diameter becomes the greatest at D3 (D3>D2). Here, such a changes in the shapes are not only influenced by time but also by wettability with respect to the medium, the strength of the surface tension of the ink itself, the size of the ink dots (ink amount), and the like.

If it is before curing by UV irradiation, in such a manner, the shape of an ink dot changes and the dot diameter widens gradually as time passes. Therefore, it is possible to adjust the size of the UV ink dots that are formed on the medium by adjusting the timing from when ink dots land on the medium until UV is irradiated or the UV irradiation output.

Figure 22:
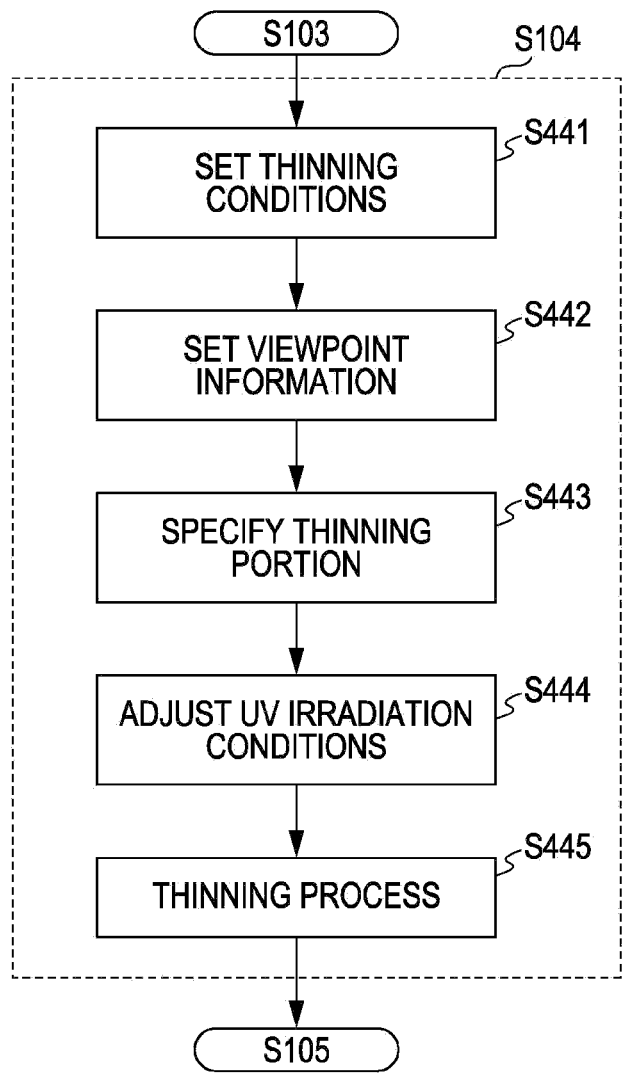
FIG. 22 is a diagram that represents the flow of a dot thinning process according to a fourth embodiment.

Therefore, in the embodiment, the shapes of the thinning patterns described above are changed by adjusting the size of the UV ink dots. A diagram that represents the flow of the dot thinning process in the fourth embodiment is illustrated in FIG. 22.

Similarly to each of the embodiments described above, after setting of the thinning conditions (S441) and setting of the viewpoint information (S442) are performed, specifying of the thinning portions is performed (S443). In the embodiment, the smaller the angle between the line of view and the image, the greater the thinning amount is set to be. Furthermore, in the embodiment, adjustment of the UV irradiation conditions is performed (S444) before executing the thinning process (S445). The adjustment of the UV irradiation conditions is a process of making the timing from when ink dots land to UV being irradiated quick for portions where the angle between the line of view and the image is small (portions where the dot thinning amount is increased) by paying attention to changes in the dot diameter when curing the UV ink dots as described above. In so doing, the ink dots do not easily spread and the ink dot diameters are kept small. That is, the ink dots that are formed are suppressed from spreading as in FIG. 21C and spilling over to portions that are specified as thinning targets. Here, a method in which adjustment of the dot diameters is performed not by changing the UV irradiation timing but by changing the UV irradiation output is also possible.

Effects of Fourth Embodiment

According to the method of the fourth embodiment, it is possible to print a metallic image with a favorable metallic luster according to differences in the angles at which the image is viewed, using UV ink. Furthermore, more precise metallic printing becomes possible by changing the UV irradiation conditions according to information such as the angle.

Other Embodiments

While printers and the like as embodiments have been described, the embodiments described above are for making the invention easy to understand, and are not to be interpreted as limiting the invention. Needless to say the invention may be modified and improved without departing from the gist thereof, and the invention includes any equivalents thereof. In particular, the embodiments described below are also included in the invention.

Ink to be Used

While examples of ink that include silver particles and aluminum particles as metallic ink have been described in the embodiments described above, the embodiments are not limited thereto. For example, it is also possible to use ink that includes other particles such as copper or gold as long as it is possible to realize a metallic luster when printing.

Further, while an example of recording using inks of the four colors of KCMY as the color ink has been described inks other than KCMY such as light cyan, light magenta, white, and clear may be used to perform recording.

Piezo Elements

Although the piezo elements PZT were exemplified as elements that perform the actions for ejecting a liquid in the embodiments described above, other elements may be used. For example, a heater element or an electrostatic actuator may be used.

Printer Driver

The processes of the printer driver may be performed by the computer 110 (PC) as an external control apparatus or may be performed by the printer 1. Here, in a case when the processes are performed by the PC, the image forming apparatus is configured by the printer driver and a PC on which the printer driver is installed.

Other Image Forming Apparatuses

While the printer 1 of a type that moves the head 41 along with the carriage was exemplified in the embodiments described above, the printer may be a so-called line printer in which the head is fixed.

What is claimed is:

1. A printer that includes a head that ejects a metallic ink on a medium, the printer comprising:
    an interface that receives setting of at least one of a first region and a second region of the medium,
    wherein the metallic ink amount per unit area which is ejected by the head on the first region of the medium is greater than the metallic ink amount per unit area which is ejected by the head on the second region of the medium
    and wherein the amount of metallic ink ejected per unit area of the medium is based on information that represents the angle between the line of view of the user and an image.

2. The printer according to claim 1,
    wherein images that are formed by the metallic ink are formed with predetermined widths and predetermined intervals on the medium, and
    the widths and the intervals are different for the first region and the second region.

3. The printer according to claim 2,
    wherein a minimum value of the widths is determined in advance.

4. The printer according to claim 3,
    wherein images by color ink are formed between the images formed by the metallic ink.

* * * * *